United States Patent [19]
Tsuchiya et al.

[11] Patent Number: 5,682,363
[45] Date of Patent: Oct. 28, 1997

[54] DISK SELECTION AND DRIVE APPARATUS FOR ELECTRONIC DEVICE

[75] Inventors: Tatsuhiko Tsuchiya; Kenji Yatsu, both of Iwaki, Japan

[73] Assignee: Alpine Electronics, Inc., Tokyo, Japan

[21] Appl. No.: 405,235

[22] Filed: Mar. 16, 1995

[30] Foreign Application Priority Data

| Mar. 17, 1994 | [JP] | Japan | 6-072482 |
| Mar. 17, 1994 | [JP] | Japan | 6-072483 |

[51] Int. Cl.$^6$ ............ G11B 17/30; G11B 33/04
[52] U.S. Cl. ............ 369/36; 369/75.1
[58] Field of Search ............ 369/36–38, 75.1, 369/75.2, 77.1, 77.2, 178, 192; 360/92, 98.01, 98.04, 99.02, 99.06

[56] References Cited

U.S. PATENT DOCUMENTS

| 5,084,854 | 1/1992 | Ikedo et al. | 369/75.1 |
| 5,159,585 | 10/1992 | Ikedo et al. | 369/36 |
| 5,245,602 | 9/1993 | Ikedo et al. | 369/75.2 |

*Primary Examiner*—Stuart S. Levy
*Assistant Examiner*—George J. Letscher
*Attorney, Agent, or Firm*—Guy W. Shoup; Norman R. Klivans, Jr.

[57] ABSTRACT

An electronic device includes a disk selection and drive apparatus to select and drive a plurality of disks or other recording media. Cartridges, each housing a recording medium therein, are held in holding areas in a disk container. Support rods of a drive unit are supported by elongated support holes to be movable in the vertical direction. A first drive member and a second drive member, each having inclined guide portions and releasing portions for guiding the support rods, are provided. A rotary member has cams to drive the first and second drive members, respectively. The cams are grooves with arched portions. When a protrusion of the first or second drive members is confined and moved by the cams, the drive unit is positioned opposite a selected one of any of the holding areas. When the first drive member is moved through a predetermined distance in the horizontal direction, the drive unit is moved vertically to access some of the holding areas. While the second drive member is moved through a predetermined horizontal distance, after the movement of the first drive member, the drive unit is moved to vertically to access the remaining holding areas.

9 Claims, 17 Drawing Sheets

DISK SELECTION AND DRIVE APPARATUS FOR ELECTRONIC DEVICE

BACKGROUND OF THE INVENTION

1. Field of the Invention

The present invention relates to a disk selection and drive apparatus for an electronic device which selects and drives a plurality of disks or other recording media. The disks can be mini-disks (which include a protective cartridge), compact disks (which do not include a cartridge), magnetic disks, floppy disks, or any other rigid or semi-rigid optical, magnetic or electronic recording media.

2. Description of Prior Art

FIG. 20 is a side elevated view illustrating the internal structure of a prior art drive apparatus for recording media (hereinafter referred to as a disk unit) in which a plurality of disks D, each accommodated in a cartridge C, are the recording media. In the disk unit of FIG. 20, a plurality of cartridges C, which protectively house the disks D, are arranged in a disk container 2 which is provided in a casing 1.

The casing 1 also contains a drive unit 3. The drive unit 3 includes a holder (not shown in FIG. 20) for holding the cartridge C introduced from the disk container 2, a turn table (not shown) on which a disk in a cartridge C is placed, a spindle motor (not shown) for rotatably driving the turn table, and a head (not shown) which is positioned opposite a portion of the disk which is exposed by the cartridge C.

The vertical or (Y) axis shown in FIG. 20 is the axis of selection. That is, the disks are stacked vertically so movement on the (Y) or vertical axis determines which disk is selected. The drive unit 3 is movable on the axis of selection so that the drive unit 3 can be positioned opposite any one of the cartridges C in the disk container 2. The casing 1 has elongated support holes 1a which extend straight on the vertical (Y) axis which, as discussed above, is the axis of selection. Support rods 4 provided on the drive unit 3 are inserted in the elongated support holes 1a.

A drive lever 5 is supported in the casing 1 and is movable on the horizontal axis to either the left (X2) direction or right (X1) direction. The drive lever 5 has guiding holes 6 formed therein which are shaped like a stairway with three levels or steps. Each of the guiding holes 6 includes a horizontal portion 6a of a first or top tier, an inclined guiding portion 6b of a first tier, a parallel portion 6c of a second or middle tier, an inclined guiding portion of a second tier 6d and a parallel portion 6e of a third or bottom tier. The horizontal and parallel portions 6a, 6b and 6c extend along the X1–X2 axis. A rack 7 with engagement teeth is fixed to the drive lever 5. A pinion gear 8, driven by a motor (not shown) meshes with the teeth of rack 7 so that rotation of the pinion gear 8 drives the drive lever 5 along the X1–X2 axis.

In FIG. 20, the drive lever 5 has moved a maximum distance in the X2 direction and the support rods 4 are in the parallel portions 6a of the first tier so that the drive unit 3 is at a position where it can select a cartridge C located at the uppermost tier in the disk container 2. As the drive lever 5 is driven in the X1 direction, the support rods 4 are guided by the first inclined guiding portion 6b and move down along the elongated support holes 1a. When the support rods 4 have moved to the second parallel portion 6c, the drive unit 3 stops at a position for selecting the cartridge C of the second tier of the disk container 2. When the drive lever 5 is further driven in the X1 direction, the support rods 4 pass along the second inclined guiding portion 6d and move down. When the support rods stop at the third parallel portion 6e, the drive unit 3 is positioned where the drive unit 3 is opposite the cartridge C in the lowermost tier of the disk container 2.

In the drive apparatus of FIG. 20, each of the guiding holes 6 for the drive lever 5 includes the horizontal portions 6a, 6c and 6e and the inclined guiding portions 6b and 6d which extend, at an incline, in the same horizontal direction as the horizontal portions. Therefore, if it is desired to move the support rods 4 from the first horizontal portion 6a to the third horizontal portion 6e, the drive lever 5 must be moved a horizontal distance L0 along the X1–X2 axis. Further, with the apparatus of FIG. 20, the guiding hole 6 must include an inclined portion and a horizontal portion for each disk positioned in the disk container 2 so that the drive unit 3 can access each disk by being positioned in a horizontal portion corresponding to that disk. Therefore, as the number of disks stacked and stored in disk container 2 increases, the length L0 of the guiding holes 6 on the horizontal axis becomes longer and longer and the drive lever 5 must move a longer and longer distance L0 from its end point in the X2 direction to its end point in the X1 direction.

The length L0 is limited by the length of the casing 1. A typical casing 1 can provide a length L0 long enough to allow for about three cartridges C, i.e., three tiers, to be stored in disk container 2 and any increase in the number of cartridges C to be held and selected increases the movement distance of the drive lever 5 along the X1–X2 axis, making the drive lever 5 protrude from the casing 1. Thus, an increase in the number of cartridges C requires increasing the size of the casing 1. This is a serious disadvantage because the size of casing 1 is typically standardized and it is desirable to keep casing 1 as small, as possible so it can fit, for example, in a vehicle.

Further, the guiding holes 6 are typically ramped as shown in FIG. 20 and the boundary between the inclined guiding portions and the horizontal portions include sharp or squared transitions. When the support rods 4 pass through these transitions the drive load, that is, the power required to push the support rods 4 past the transition or boundary portions, of the drive lever 5 increases as the support rods 4 are pushed through the boundary portions. Since the drive load increases when the support rods 4 pass the boundaries and decreases when the support rods 4 move through, for example, the parallel portions 6c, there are increased variations in the load of the drive lever 5, and the movement of the drive lever 5 becomes sudden, forceful, and jerky. This makes smooth driving of the drive lever 5 impossible.

Further, since variations in the load applied to the drive lever 5 can be significant, the meshing portion between the pinion gear 8 and the rack 7 wears down relatively quickly, and the meshing portion between the gears in a speed reduction mechanism provided in the power transmission portion extending from an output shaft of the motor to the pinion gear 8 also wears readily. Further, the sharp edges of the boundary portions of the guiding holes 6, particularly the internal edge portion of the squared boundary, wears down and deforms relatively rapidly due to jerking motion and impact of the support rod 4.

Thus, the drive apparatus of FIG. 20 is limited in its ability to hold more than three cartridges C and is subject to considerable mechanical stress and wear during normal operation.

SUMMARY

In accordance with the present invention, a drive apparatus for recording media which enables a large number of recording media to be selected for playing even when a distance through which a drive member is moved is short, so as to achieve an increase in the number of recording media to be selected, or a reduction in the entire size of the apparatus. The present apparatus also enables the drive member to be moved more smoothly than in the prior art.

In one embodiment of the present invention, the disk selection and drive apparatus for recording media includes: a disk container housing a plurality of recording media; a drive unit which moves on a selection axis and thereby selects and drives a selected one of the recording media; a first drive member and a second drive member which move along an axis which is perpendicular the selection axis; and a drive mechanism moving the first and second drive members separately.

The first drive member has a first inclined guide portion for moving the drive unit along the selection axis and a first releasing portion for allowing for the drive unit to move along the selection axis.

The second drive member has a second releasing portion for allowing for the drive unit to move along the selection axis when the drive unit is located within the first inclined guide portion of the first drive member and a second inclined guide portion for moving the drive unit on the selection axis when the first releasing portion allows for the movement of the drive unit.

The drive mechanism for moving the first and second drive members at different times may be such that it first moves the first drive member through a distance which ensures that the drive unit can be moved on the selection axis by the first inclined guide portion, and then moves the second drive member through a distance which ensures that the drive unit can be moved on the selection axis by the second inclined guide portion without moving the first drive member.

The drive mechanism may include a rotary member having a first cam portion for moving the first drive member and a second cam portion for moving the second drive member.

A second embodiment includes: a disk container housing a plurality of recording media; a drive unit which moves on a selection axis whereby any of the recording media in the disk container can be selected and driven; a single drive member which moves on an axis which is perpendicular to the selection axis; a switching guide member; and a drive mechanism providing reciprocal movement of the drive member.

In this embodiment, the drive member has an outward inclined guide portion for moving the drive unit along the selection axis in one direction, and a return declined guide portion formed continually with the outward inclined guide portion to move the drive unit along the selection axis in a direction opposite to the first direction.

The switching guide member is used for transferring the drive unit from the inclined guide portion to the declined guide portion at a boundary between the inclined guide portion and the declined guide portion.

The inclined guide portion and the declined guide portion may be formed to be inclined in opposite directions with respect to the direction of movement of the drive member, or they can be continually formed in the shape of a leftward-directed letter V. The switching guide member may have a guide or urging passage which acts as a movement guide for moving the drive unit between the inclined and declined guide portions without retracting the drive unit at the boundary between the inclined guide portion and the declined guide portion. This guide passage may have the shape of an elongated zig-zag having an upper elongated portion, a lower elongated portion and an inclined switching passage for connecting the two portions. In one embodiment, the guide passage is moved through a short distance in the same direction as the drive member is moved.

A third embodiment includes: a disk container housing a plurality of recording media; a drive unit which moves on a selection axis; a drive member which moves on an axis which perpendicular to the selection axis; a power converting portion converting a motion force on the drive member along its axis into a motion force on the drive unit along the selection axis; a cam portion guiding the drive member; and a drive source rotating the cam portion.

In this embodiment, the cam portion has arched portions, each formed on an arched locus of a predetermined radius with respect to a center of rotation of the rotary member, for confining the drive member when the drive unit is at a selected position to select any of the recording media, and drive portions connecting adjacent arched portions to move the drive member.

The power converting portion of this embodiment may include an inclined guide portion formed in either the drive unit or the drive member which is inclined with respect to the selection axis, and a guided portion provided in the other of the drive unit or drive member to be guided by the inclined portion.

An elongated hole, a groove or a rail-shaped inclined guide portion may be provided in the drive member so as to be inclined with respect to the selection axis, while a pin, a protrusion, a sliding portion, or a roller which slides in the elongated hole or the groove, is formed on the drive unit to function as the guided portion. Conversely, an elongated hole, a groove or a rail-shaped inclined guide portion may be provided in the drive unit so as to be inclined with respect to the selection axis, while a pin, a protrusion, a sliding portion, or a roller which slides within the elongated hole is formed on the drive member to function as the guided portion.

Alternatively, a link shaped as a sideways V may be provided as the power converting portion. In this embodiment, the lower end of the link is supported on the chassis and the drive unit is supported on the upper end of the link and is coupled to the bending point of the V-shaped link. The deformation angle of the V-shape is varied by the moving force of the drive member, whereby the drive unit is moved up or down.

Alternatively, the drive unit may be supported in such a manner as to be movable with respect to the chassis by a pantagraph mechanism. In this embodiment, the deformed state of the pantagraph mechanism is varied by the moving force of the drive member, whereby the drive unit is moved.

Where the cam portion is a groove, the arched portion provided in the cam portion to confine the drive member may be a protrusion or a pin formed on the drive member and retained in the cam groove. Where the cam portion is a rail-shaped cam, a recessed portion into which the rail-shaped cam is fitted may be formed in the drive member.

In the first embodiment discussed above, the first and second drive members move the drive unit on the selection axis. When the drive unit is moved on the selection axis by the first inclined guide portion of the first drive member, the second releasing portion of the second drive member allows the drive unit to freely move on the selection axis. It is therefore not necessary for the second drive member to be moved at all when the drive unit is moved by the first drive member. Similarly, while the drive unit is moved on the selection axis by the second inclined guide portion of the second drive member, the first releasing portion of the first drive member allows movement of the drive unit on the selection axis. It is therefore not necessary for the first drive member to be moved while the drive unit is moved by the second drive member. Accordingly, the drive unit can be moved through twice the distance by the first and second drive members by moving the respective drive members at different times, and the drive unit can thus be moved to the selection positions corresponding to more recording media than possible in the same space of a prior art system.

Further, in the first embodiment, since the drive member in which the guide portion is formed is divided into the first and second members, the sum of the movement distances of the two drive members is relatively long, however, the movement distance of either individual drive member is relatively short. Thus, the movement region in the casing can be reduced.

Other embodiments may include third and fourth drive members, each having an inclined guide portion and a releasing portion.

In the first embodiment, accurately timed driving of the first and second drive members is achieved by the rotation of the single rotary member provided in the drive mechanism. Since the single rotary member is used to drive both the first and second drive members, the structure of the drive mechanism is simplified In the second embodiment, while the drive member moves in one direction, the drive unit is moved along the selection axis by the outward inclined guide portion. On the boundary between the inclined guide portion and the declined guide portion, the drive unit is handed over from the inclined guide portion to the declined guide portion by the switching guide portion. After the drive unit has been introduced into the declined guide portion, the drive unit is continually moved along the selection axis by moving the drive member in the direction opposite to the above-described direction. In this embodiment of the invention, since the drive member is reciprocally moved, the actual movement region of the drive member can be made short, and the drive unit can be moved for the selection of many recording media.

Further, in the second embodiment, the inclined guide portion may be an elongated hole or groove formed in the drive member. Where the guide portion is an elongated hole or groove, part of the drive unit which slides in the elongated hole or groove may be a pin, a protrusion or a roller. Where the inclined guide portion is a rail, part of the drive unit may be a protrusion which slides along the rail, a recess, or a roller.

The switching guide portion may be a switching guide passage having a crank-like shape which moves a protrusion provided on the drive unit which has moved along one of the inclined guide portion and reached the boundary into the other guide portion. Alternatively, the switching guide portion may be an urging member or a spring member which pushes the protrusion toward one of the inclined guide portions from the other inclined guide portion.

When the cam portion of the third embodiment is rotated by the drive source, such as a motor, the drive member is guided by the cam portion. The moving force of that drive member is converted by the power converting portion, whereby the drive unit is moved along the selection axis in which it can select either of the recording media. While the drive member is moved by the drive portion formed in the cam portion, the drive unit moves on the selection axis. When the rotation of the cam portion stops in a state wherein the drive member is confined to the arched portion of the cam portion, the drive member is positioned. Thus, the drive unit is confined without backlash through the power converting portion and can be positioned accurately at a position where it can select either of the recording media.

Thus, the power converting portion does not require an element for positioning the drive unit, such as the parallel portions 6a, 6c and 6e shown in FIG. 20, and the movement distance of the drive member can be shortened accordingly. Since the movement distance of the drive member within the limited space of the casing can be shortened, the efficiency of layout of the mechanisms in the casing or chassis is improved, and the degree of freedom for system configurations increased.

Where a rotating cam portion is used, since the connecting portion between the arched portion and the drive portion can be formed in a curve, power load variations which could occur when the drive member is guided from the arched portion of the cam portion to the drive portion, are lessened compared with the case of the drive lever shown in FIG. 20. Thus, the movement of the drive member is smooth, and wear of the power converting portion thus reduced. Further, wear of the meshing portion of the gears in the power transmitting portion, such as a motor, is lessened.

DETAILED DESCRIPTION OF THE PREFERRED EMBODIMENTS

Embodiments of the present invention are described below with reference to the accompanying drawings.

Figure 1:
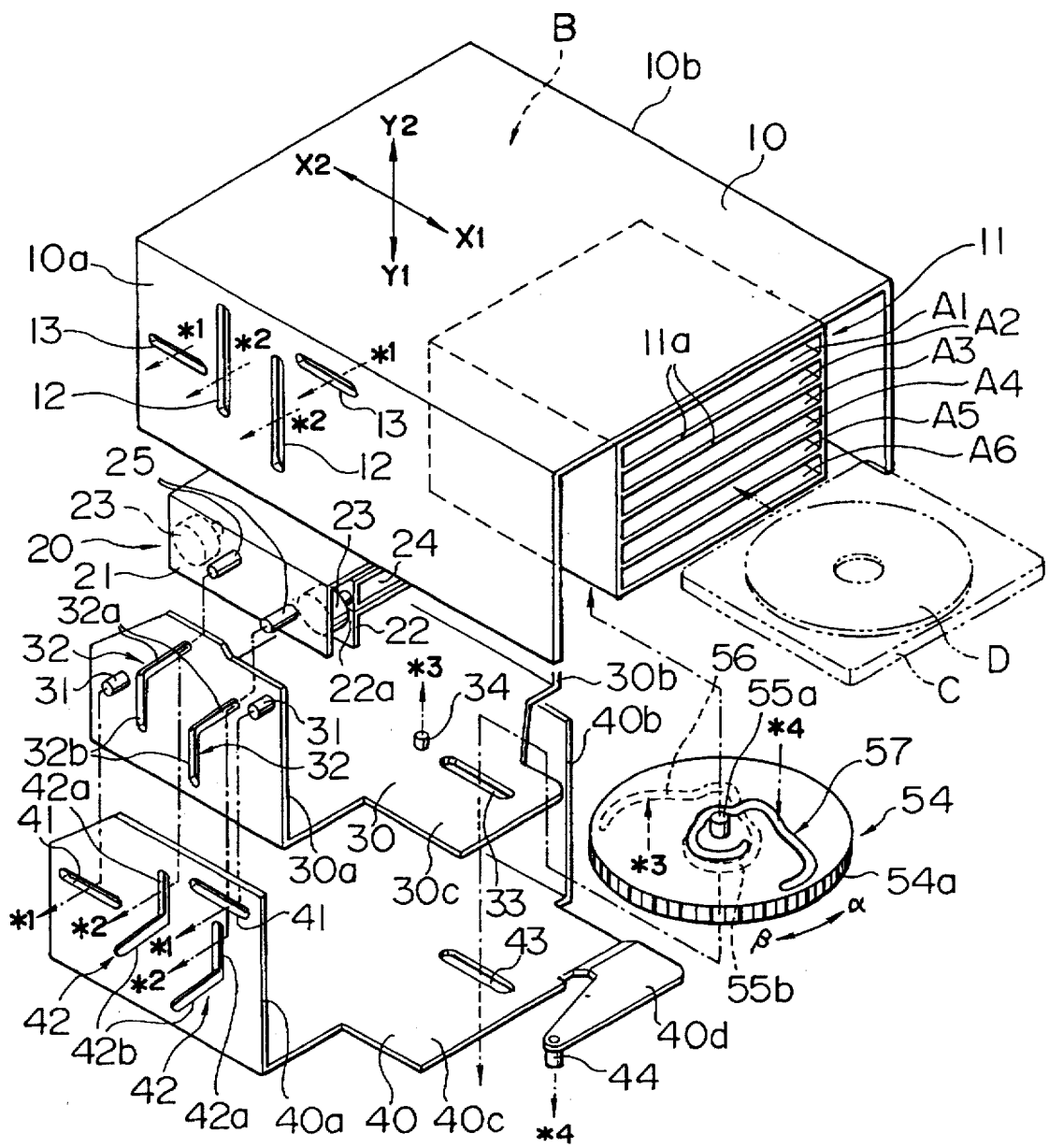
FIG. 1 is an exploded perspective view of the internal mechanism of a disk unit according to a first embodiment of the invention.
Figure 2:
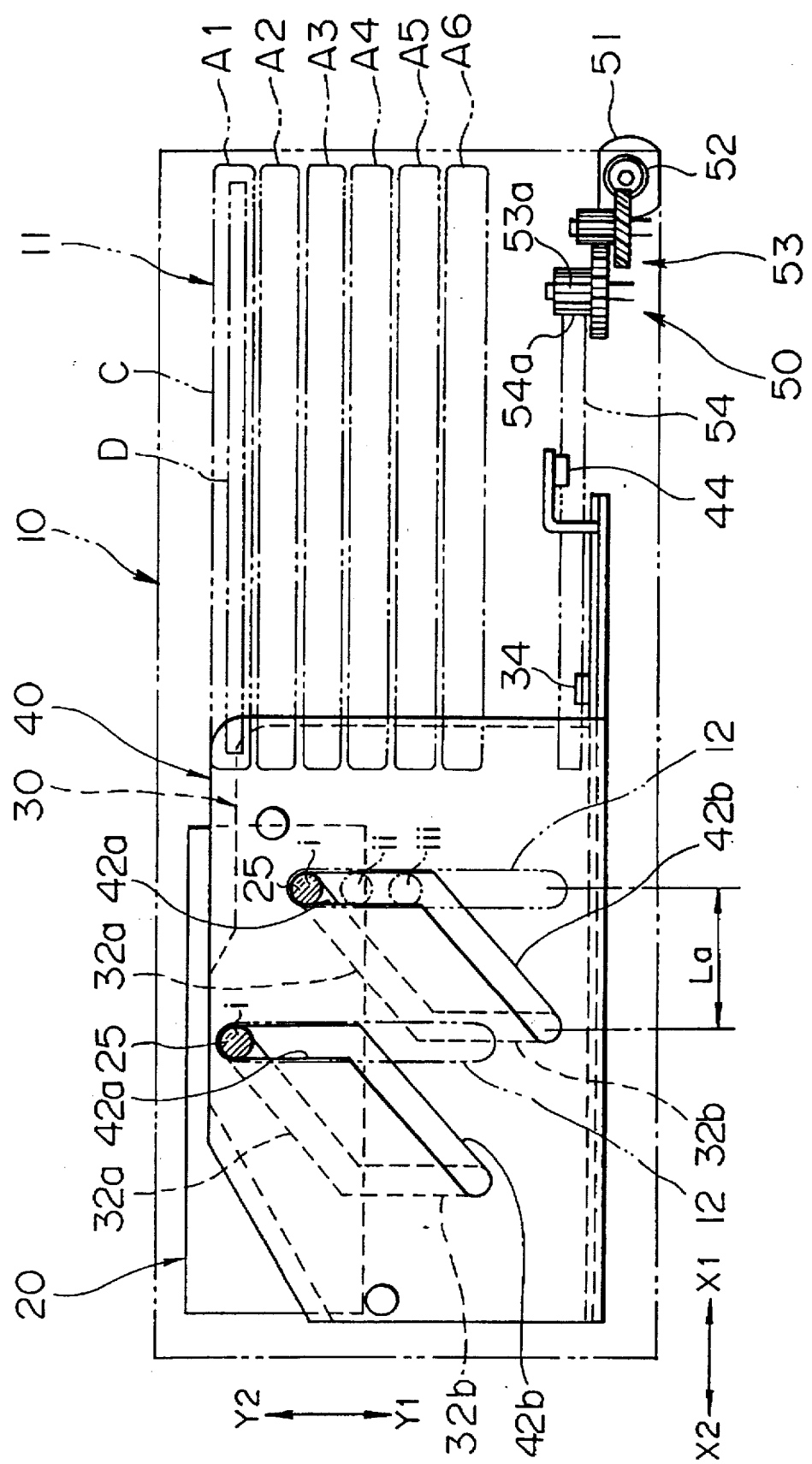
FIG. 2 is a side elevated view of the disk unit of FIG. 1.
Figure 3A:
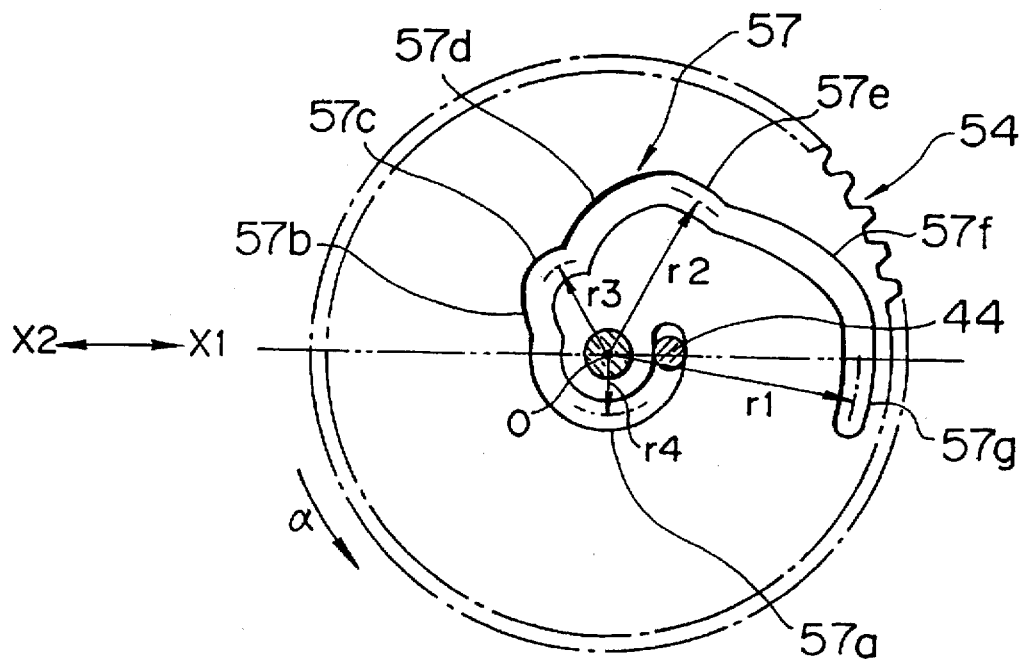
FIG. 3A is a plan view of a rotary member according to the invention showing a second cam portion selecting a first tier.
Figure 3B:
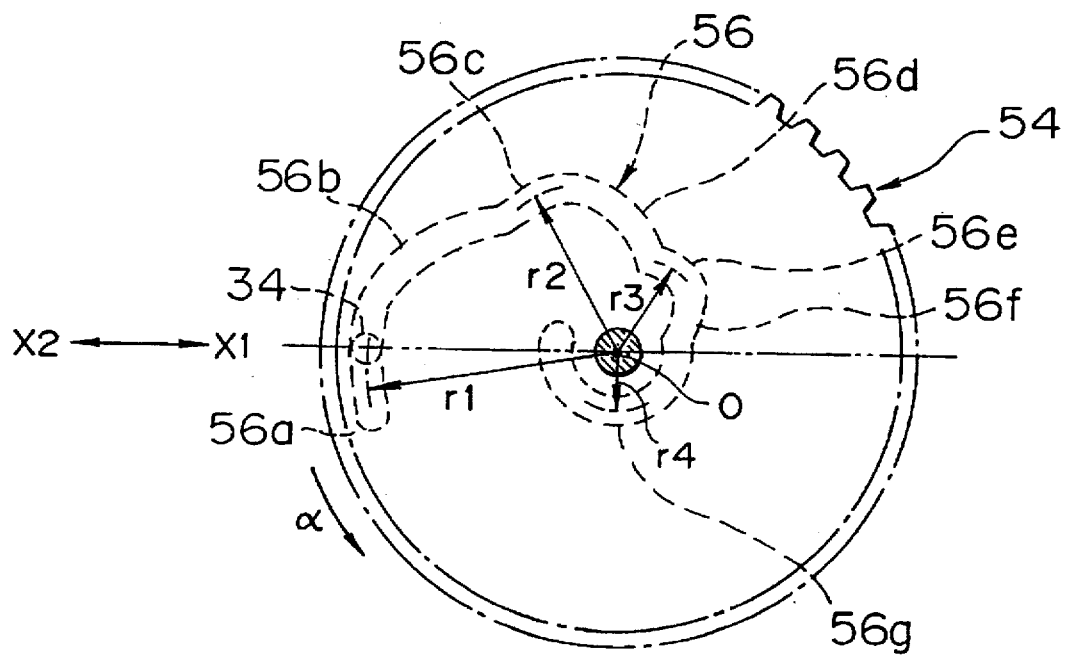
FIG. 3B is a plan view of the rotary member showing a first cam portion selecting a first tier.

FIG. 1 is an exploded perspective view of a mechanical portion of a disk unit according to the invention. FIG. 2 is a side elevated view of the chassis shown in FIG. 1. FIGS. 3A and 3B are plan views of a rotary member according to the invention.

Referring to FIG. 1, a metal chassis 10 is housed in a casing of a disk unit. The casing (not shown) for housing the metal chassis 10 is typically embedded in a console panel (dash board) of a vehicle. Thus, the size of the metal chassis 10 is limited to a size which enables it to be fit in the casing.

A disk container 11 is fixed in the chassis 10 at a front portion thereof. The interior of the disk container 11 is partitioned by a plurality of partitioning members 11a to form a disk holding area (also called a holding area) A1 located at the top of disk container 11, a holding area A2 of a second tier, a holding area A3 of a third tier, a holding area A4 of a fourth tier, a holding area A5 of a fifth tier and a holding area A6 of a sixth tier. The recording media used in this embodiment are disks D. Each disk D can be a "mini-disk" and thus be encased in a protective cartridge C. The disks D can also be compact disks, which do not include a cartridge, "floppy disks", or any other form of rigid or semi-rigid optical, magnetic, or electronic media. In the embodiment shown in FIG. 1, an insertion port is formed in the front surface of the casing which is embedded in the console panel of a vehicle so that it is directed towards the passenger compartment of the vehicle. The cartridges C are manually inserted by the driver into the individual holding areas A1–A6 from the insertion port. A retaining mechanism (not shown), e.g., a spring for temporarily retaining the cartridge C is provided in each of the holding areas A1–A6.

According to this embodiment of the invention, the disk container 11 is fixed to the chassis 10. However, the disk container may also be a magazine-type disk container 11 which is detached from the chassis 10.

As shown in FIG. 1, the back portion of the interior of the chassis 10 includes a selection mechanism housing B of a drive unit 20. The drive unit 20 is movable up or down, i.e., in the Y2 or Y1 directions, respectively, as viewed in FIG. 1. The vertical or Y1–Y2 axis is the axis of movement of the drive unit 20. A particular cartridge C, positioned in any of the holding areas A1–A6, is selected as a consequence of this vertical movement of the drive unit 20 as discussed in more detail below.

As shown in FIG. 1, the drive unit 20 has a unit base 21. In the unit base 21, a mechanism base 22 is supported through dampers 23. The mechanism base 22 has a cartridge holder 24. When a cartridge C, containing a disk D is selected, the cartridge C, positioned in one of the holding areas A1–A6, is introduced into cartridge holder 24. A turn table or disk drive unit (not shown) is mounted on mechanism base 22. A central portion of the disk D in the cartridge C is then placed on the turn table and a spindle motor (not shown) drives the turn table. A reading and/or recording head (not shown) is positioned opposite to the recording surface of the disk D which is exposed by a window in the cartridge C for reproduction or recording.

Each of the dampers 23 has a bag member (not shown) made of, for example, rubber, with a highly viscous fluid, such as an oil, or air contained therein. A shaft 22a is fixed to the mechanism base 22 and is inserted into the bag member. Thus, the mechanism base 22 is elastically supported in the unit base 21 through the dampers 23, whereby vehicle vibrations, which can act on the unit base 21 through the chassis 10 and affect the head mounted on the mechanism base 22, are lessened.

A pair of support rods 25 are fixed to a left surface of the drive unit 20 (as seen in FIG. 1) which serves as a guided portion to selectively move drive unit 20 as discussed below. A pair of elongated vertical support holes 12 are formed in a left plate 10a of the chassis 10. The support rods 25 are inserted into the elongated vertical support holes 12. The elongated vertical support holes 12 extend parallel to the selection axis, i.e., the vertical or Y1–Y2 axis, to support the unit base 21 of the drive unit 20 so that drive unit 20 is movable in the Y1–Y2 directions.

Although not shown in FIG. 1, elongated vertical support holes 12, similar to those in the left plate 10a, are formed in a right plate 10b of the chassis 10, and support shafts 25, which are guided by the elongated vertical support holes 12, are provided on a right surface of the unit base 21 of the drive unit 20. Thus, the drive unit 20 is supported so as to be movable in the Y1–Y2 directions relative to both the right and left surfaces 10a and 10b of the chassis 10. The elongated vertical support holes 12 function as guide supports for guiding the drive unit 20 along the selection axis, i.e., the Y1–Y2 directions. However, the guide support portions are not limited to the elongated vertical support holes 12 and a plurality of guide support rods or guide rods (not shown) may be provided within the chassis 10 in such a manner that they extend in the Y1–Y2 directions.

A first drive member 30 and a second drive member 40 are provided below the drive unit 20 in the chassis 10. Each of the drive members 30 and 40 is a slider or lever frame formed by bending a plate, typically a metal plate, into a U-shape. The first drive member 30 has a left plate 30a and a right plate 30b, while the second drive member 40 has a left plate 40a and a right plate 40b. A bottom plate 30c of the first drive member 30 is positioned on top of a bottom plate 40c of the second drive member 40. The two plates 30a and 30b of the first drive member 30 are positioned on the inner sides of the two surfaces 40a and 40b of the second drive member 40, respectively. Both the left plates 30a and 40a are positioned between the left plate 10a of the chassis 10 and the left surface of the unit base 21 of the drive unit 20, while the right plates 30b and 40b are positioned between the right surface 10b of the chassis 10 and the right plate of the unit base 21.

A guiding mechanism is provided in both the left plate 30a of the first drive unit 30 and the left plate 40a of the second drive member 40. A similar guiding mechanism is provided in both the right plate 30b of the first drive member 30 and the right plate 40b of the second drive member 40. The guiding mechanism provided in both the left plate 30a and left plate 40a will be discussed below in detail.

A pair of guide rods 31 are fixed to the outer surface of the left plate 30a of the first drive member 30. Elongated horizontal guide holes 41 are formed in the left plate 40a of the second drive member 40, and elongated horizontal guide holes 13 are formed in the left surface 10a of the chassis 10. As indicated by assembly lines (*1), the guide rods 31 are inserted first into the elongated horizontal guide holes 41 and then into the elongated horizontal guide holes 13. The elongated horizontal guide holes 41 and 13 extend along the horizontal axis, i.e., the X1–X2 directions perpendicular to the selection axis, i.e., the Y1–Y2 directions, whereby the first and second drive members 30 and 40 are independently movable in the X1–X2 directions relative to the chassis 10.

A pair of angle guide holes 32 are formed in the left plate 30a of the first drive member 30. Each of the angle guide holes 32 has a first inclined guide portion 32a and a first releasing portion 32b. As shown best in FIG. 2, the first inclined guide portion 32a is an elongated hole extending slantingly rightward, and the first releasing portion 32b is a vertical elongated hole which extends parallel to the selection axis. Thus, the releasing portion 32b (as well as releasing portion 42a) is an elongated releasing hole.

A pair of angle guide holes 42 are formed in the left plate 40a of the second drive member 40. Each of the angle guide holes 42 has a second releasing portion 42a and a second inclined guide portion 42b. The second releasing portion 42a is a vertical elongated hole which extends parallel to the selection axis, i.e., the Y1–Y2 directions. The second inclined guide portion 42b is an elongated hole which extends slantingly rightward. As shown in FIG. 2, the first and second inclined guide portions 32a and 42b are formed at the same inclination angle but incline in opposite directions.

As indicated by assembly lines (*2) in FIG. 1, the support rods 25 fixed to the unit base 21 of the drive unit 20 pass through the angle guide holes 32 of the first drive member 30 and the angle guide holes 42 of the second drive member 40 and are then inserted into the elongated vertical support holes 12 formed in the left plate 10a of the chassis 10, as mentioned above.

In this embodiment of the invention, both the support rods 25, which are the guided portions of the drive unit 20, and the first inclined guide portions 32a form a power converting portion for converting the directional force of the first drive member 30 in the X1–X2 directions, i.e., along the horizontal axis, into a directional force on the drive unit 20 along the selection axis, i.e., vertical, while both the support rods 25 and the second inclined guide portions 42b constitute a direction converting mechanism for converting the directional force of the second drive member 40 in the X1–X2 directions into a directional force on the drive unit 20 on the section axis or Y1–Y2 directions.

As shown in FIG. 2, a drive mechanism 50 is provided in the chassis below the disk container 11. The first and second drive members 30 and 40 are driven in the X1–X2 directions by the drive mechanism 50. The drive mechanism 50 includes a motor 51, serving as a drive source, a worm gear 52 provided on an output shaft of the motor 51, a speed reduction gear train 53 for reducing and transmitting the rotational speed of the worm gear 52, and a rotary member 54. The rotary member 54 is a spur gear having a toothed portion 54a on a periphery thereof. A pinion gear 53a forming the final stage of the speed reduction gear 53 is in mesh with the toothed portion 54a. The rotary member 54 can be rotated in two directions by the power of the motor 51.

As shown in FIG. 1, the rotary member 54 is typically made of a resin material (plastic), and has an upper shaft 55a and a lower shaft 55b formed integrally with the rotary member 54 at a central portion thereof. The upper shaft 55a is rotatably supported by a bearing portion (not shown) provided below the disk container 11. The lower shaft 55b is inserted into an elongated shaft hole 33 formed in the bottom plate 30c of the first drive member 40. Elongated shaft hole 33 extends in the X1–X2 directions. An elongated shaft hole 43 formed in the bottom plate 40c of the second drive member 40 also extends in the X1–X2 directions and lower shaft 55b also extends through shaft hole 43 with a lower end of the lower shaft 55b being rotatably supported by, for example, a bottom plate (not shown) provided below the chassis. The elongated shaft holes 33 and 43 are releasing holes which prevent interference of the drive members 30 and 40 with the lower shaft 55b.

A groove of a first cam portion 56 is formed in the under surface of the rotary member 54, as indicated by broken lines in FIG. 1. A slide protrusion 34, fixed to the bottom plate 30c of the first drive member 30, is inserted into the groove of the first cam portion 56. As the rotary member 54 rotates, the slide protrusion 34 is positioned in and moves in the groove of the first cam portion 56, whereby the first drive member 30 is driven in the X1–X2 directions.

A groove of a second cam portion 57 is formed in an upper surface of the rotary member 54. An arm 40d formed integrally with the second drive member 40 rises from an end portion of the bottom plate 40c and extends above the rotary member 54. As indicated by assembly line (*4) in FIG. 1, the slide protrusion 44 is inserted into the groove of the second cam portion 57. Thus, as the rotary member 54 is rotated, the slide protrusion 44 is positioned in and moves in the groove of the second cam portion 57, whereby the second drive member 40 is driven in the X1–X2 directions FIGS. 3A and 3B are plan views of the rotary member 54. For clarity, only the second cam portion 57 is illustrated in FIG. 3A and only the first cam portion 56 is illustrated in FIG. 3B. In FIGS. 3A through 12, a rotational angle (a rotational phase) of the rotary member 54 is shown as an angle with respect to the horizontal or X1–X2 directions using the X1–X2 axis as a reference. In each figure, the rightward direction is the X1 direction and the leftward direction is the X2 direction.

As shown in FIG. 3B, the first cam portion 56 has an arched portion 56a corresponding to a first tier, a drive portion 56b, an arched portion 56c corresponding to a second tier, a drive portion 56d, an arched portion 56e corresponding to a third tier, a drive portion 56f, and an arched portion 56g for switching. The respective portions of cam portion 54 are formed as a continuous groove with the arched portion 56a located closest to the outer periphery of the rotary member 54. Rotary member 54 also includes a center O.

The centers of the grooves of the arm portions are coincident with arched loci of radii r1, r2, r3 and r4 of a circle having the center O. Thus, when the slide protrusion 34 is located within the groove of any of the arched portions 56a, 56c, 56e and 56g and the rotary member 54 is at a stop, there is no movement of the first drive member 30 in the X1–X2 directions and the first drive member 30 is positioned at a predetermined point in that direction. That is, the width of the groove of the first cam portion 56 and the outer diameter of the slide protrusion 34 (see FIG. 1) are machined with a high degree of accuracy for a tight fit. The same relationship as that provided between the first cam portion 56 and the slide protrusion 34 is established between the second cam portion 57 and the slide protrusion 44 (see FIG. 1).

When the slide protrusion 34 is located within the groove of any of the drive portions 56b, 56d and 56f, the first drive member 30 is driven in either the X1 direction or the X2 direction depending on the direction of rotation of the rotary member 54.

As shown in FIG. 3A, the second cam portion 56 has an arched portion 57a, a drive portion 57b, an arched portion 57c corresponding to a fourth tier, a drive portion 57d, an arched portion 57e corresponding to a fifth tier, a drive portion 57f, and an arched portion 57g corresponding to a sixth tier. The respective portions of cam portion 57 are formed as a continuous groove with the arched portion 57a located closest to the center O of the rotary member 54. The centers of the widths of the arched portions 57a, 57c, 57e and 57g are coincident with the arched loci of the radii r4, r3, r2 and r1 of a circle having a center at O. The radii r1, r2, r3 and r4 shown in FIG. 3A are located at the same distances as the radii r1, r2, r3 and r4 shown in FIG. 3B. That is, in the plan views of FIGS. 3A and 3B, the first and second cam portions 56 and 57 are symmetrical with respect to the center O in the X1-X2 directions.

When the slide protrusion 44 (see FIG. 1) is positioned within any of the arched portions 57a, 57c, 57e and 57g and the rotary member 54 is at a stop, there is no movement of the second drive member 40 in the X1-X2 directions and the second drive member 40 is positioned at a predetermined location in that direction. When the slide protrusion 44 is located within the groove of either of the drive portions 57b, 57d and 57f, the second drive member 40 is driven in either of the X1 or X2 directions depending on the direction of rotation of the rotary member 54.

The drive unit 20 is moved on the selection axis, i.e., in the vertical or Y1-Y2 directions, by the guiding operation of the horizontal movement drive members 30 and 40 as discussed in detail below. When the cartridge holder 24 in the drive unit 20 is located at a position where it faces any one of the holding areas A1-A6, the cartridge C in any one of the holding areas A1-A6 can be selected. Although not shown in FIG. 1, a conveying mechanism designed to move in the Y1-Y2 directions with the drive unit 20 is provided. When the cartridge holder 24 is located opposite any of the holding areas A1-A6, the cartridge C located at the selected holding area is introduced into the cartridge holder 24 by the conveying mechanism. Also, after reproduction or recording of cartridge C is complete, the conveying mechanism returns the cartridge C to its original holding area.

The operation of the disk unit discussed above will now be described.

The selection movement for moving a cartridge C in any of the holding areas A1-A6 is conducted by operating the motor 51 in the drive mechanism 50 (see FIG. 2).

The power of the motor 51 is transmitted from the worm gear 52 to the rotary member 54 through the speed reduction gear train 53. During the rotation of the rotary member 54, the position of the first drive member 30 is controlled by the first cam portion 56 (see FIG. 3A) and the position of the second drive member 40 is controlled by the second cam portion 57 (see FIG. 3B). The position of the drive unit 20 on the selection axis is controlled by the horizontal movement of drive members 30 and 40. When the rotary member 54 is rotated in a direction α (alpha) shown in FIG. 1, the drive unit 20 is moved in the selection direction Y1 or the down direction. When the rotary member 54 is rotated the β (beta) direction, the drive unit 20 is moved in the selection direction Y2 or the up direction.

FIG. 2 illustrates a state wherein the drive unit 20 has moved to the furthest position in the Y2 direction, i.e., to the uppermost position, and the cartridge holder 24 opposes the holding area A1 of the first tier (the uppermost tier). Thus, in this state, the cartridge C in the holding area A1 can be selected.

Movement of the drive unit 20 in the Y1 direction, conducted when the rotary member 54 rotates in the α direction from the position shown in FIG. 3, is illustrated in FIGS. 3 through 12.

Figure 8:
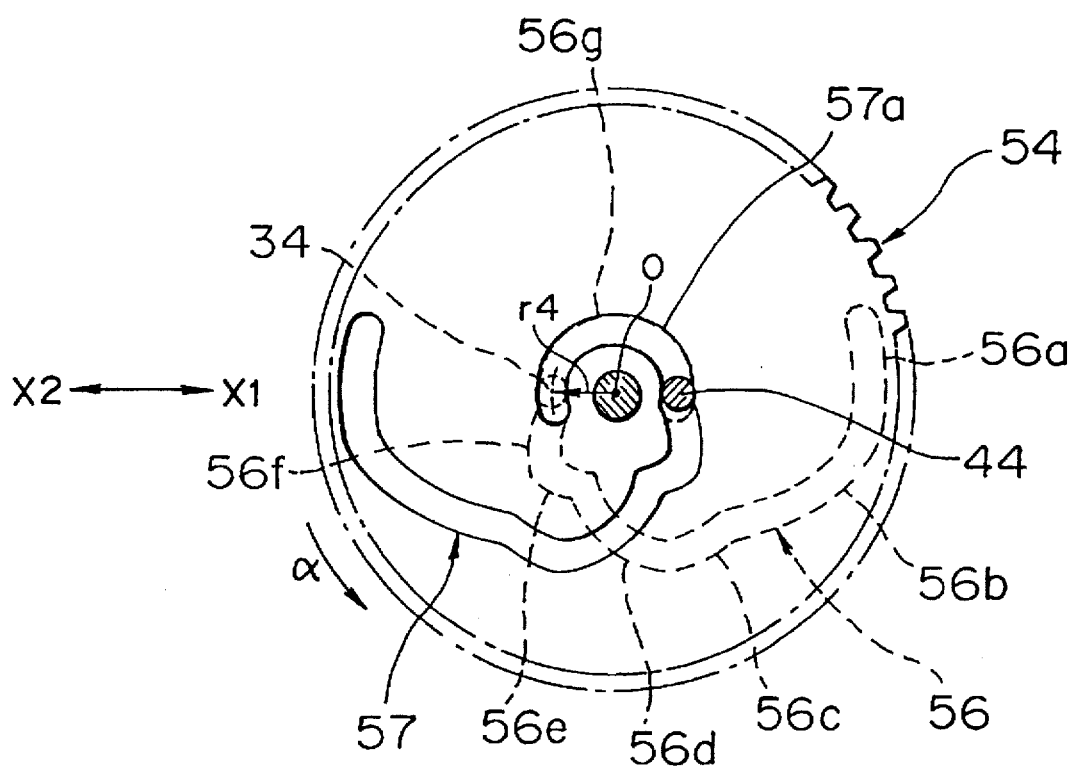
FIG. 8 is a plan view of the rotary member corresponding to FIG. 7.

FIGS. 3A and 3B illustrate the rotational phase of the rotary member 54 when the drive unit 20 has moved to the selection position for the holding area A1 of the first tier of the disk container 2 shown in FIG. 2. When the rotary member 54 rotates from the state shown in FIGS. 3A and 3B, through the state shown in FIGS. 4 and 5, to the state shown in FIG. 8, the rotary member 54 rotates almost 180 degrees. When the rotary member 54 rotates from the state shown in FIG. 8, through the state shown in FIGS. 10 and 11, to the state shown in FIG. 12, the rotary member 54 rotates by almost a second 180 degrees. Thus, FIG. 8 illustrates a state wherein the rotary member 54 has rotated from the state shown in FIGS. 3A and 3B in the α (alpha) direction by almost 180 degrees. FIG. 12 illustrates a state wherein the rotary member 54 has rotated from the state shown in FIG. 3A and 3B in the α (alpha) direction by 360 degrees.

In this embodiment of the invention, there are six holding areas A1-A6, and there are up to six cartridges in the disk container 11. Selection of the cartridges C in the holding areas A1, A2 and A3 of the upper three tiers is conducted while the rotary member 54 is rotating through the first 180 degrees from the state shown in FIGS. 3A and 3B to the state shown in FIG. 8. Selection of the cartridges C in the holding areas A4, A5 and A6 of the lower three tiers is conducted while the rotary member 54 is rotating through the second 180 degrees, from the state shown in FIGS. 8 to the state shown in FIG. 12.

While the rotary member 54 is rotating in the α (alpha) direction by the first 180 degrees from the state shown in FIGS. 3A and 3B to the state shown in FIG. 8, the slide protrusion 44 moves (slides) in the arched portion 57a of the second cam portion 57. Since the arched portion 57a is an arched locus of the fixed radius r4 with respect to the center O of the rotary member 54, the second drive member 40 is not driven during that time and remains at an end portion in the X2 direction (at the left most position in the FIG. 2). At this time, the second releasing portions 42a of the guide holes 42 formed in the second drive member 40 are coincident with the elongated vertical support holes 12 formed in the chassis 10, as shown by the solid lines in FIG. 2. Thus, while the rotary member 54 is rotating from the state shown in FIGS. 3A and 3B to the state shown in FIG. 8, the releasing portions 42a of the second drive member 40 continue to allow movement of the support rods 25, i.e., the drive unit 20, on the selection axis (the Y axis).

Further, while the rotary member 54 is rotating through the first 180 degrees from the state shown in FIGS. 3A and 3B to the state shown in FIG. 8, the first drive member 30 is driven by the first cam portion 56 in the X1 direction (i.e., the right hand direction). Thus, in the state shown in FIG. 3B, the slide protrusion 34 (see FIG. 1) is located at the arched portion 56a (see FIG. 3b) of the first cam portion 56 located closest to the outer periphery of the rotary member 54, and the first drive member 30 is at the end of its movement range in the X2 direction. Accordingly, the first inclined guide portions 32a formed in the first drive member 30 (see FIG. 2) are at positions indicated by the broken lines in FIG. 2. Consequently, the support rods 25 are at upper distal end positions (i) of the first inclined guide portions 32a and the drive unit 20 is positioned at the uppermost position in the Y2 direction and can access the first tier of the disk container 11, i.e. holding area A1. At this time, if the rotary member 54 is at a stop, the cartridge holder 24 stops and can select the cartridge C in the holding area A1 of the first tier. The arched portion 56a corresponding to the first tier of the first cam portion 56 is coincident with the arched locus of the radius r1 from the center O of the rotary member 54. Thus, if the width of the groove of the first cam portion 56 and the outer diameter of the slide protrusion 34 are formed with a high degree of accuracy, the slide protrusion 34 can be positioned on the horizontal axis, i.e., in the X1–X2 directions in the state shown in FIG. 2. By providing this high degree of machined accuracy, backlash or jerking of the first drive member 30 in about its desired vertical position can be eliminated and the drive unit 20 can be positioned accurately where it can select the cartridge C in the holding area A1 of the first tier.

When the drive unit 20 is positioned where it can select the holding area A1 of the first tier, the cartridge C in the holding area A1 of the first tier is introduced into the cartridge holder 24 by a conveying mechanism (not shown) and the central portion of the disk D in the cartridge C is set on the turn table (not shown) provided on the mechanism base 22. Then, the turn table and the disk D are rotated by the spindle motor, and reproduction or recording of disk D is performed by the reproduction/recording head (not shown). When reproduction or recording has been completed, the disk D is disengaged from the turn table, and the cartridge C in the cartridge holder 24 is returned to its holding area A1 by the conveying mechanism. The introduction of the cartridge and reproduction and returning of the cartridge, for holding areas A2–A6, are conducted in the same manner as discussed above with the respect to the holding area A1.

Figure 4:
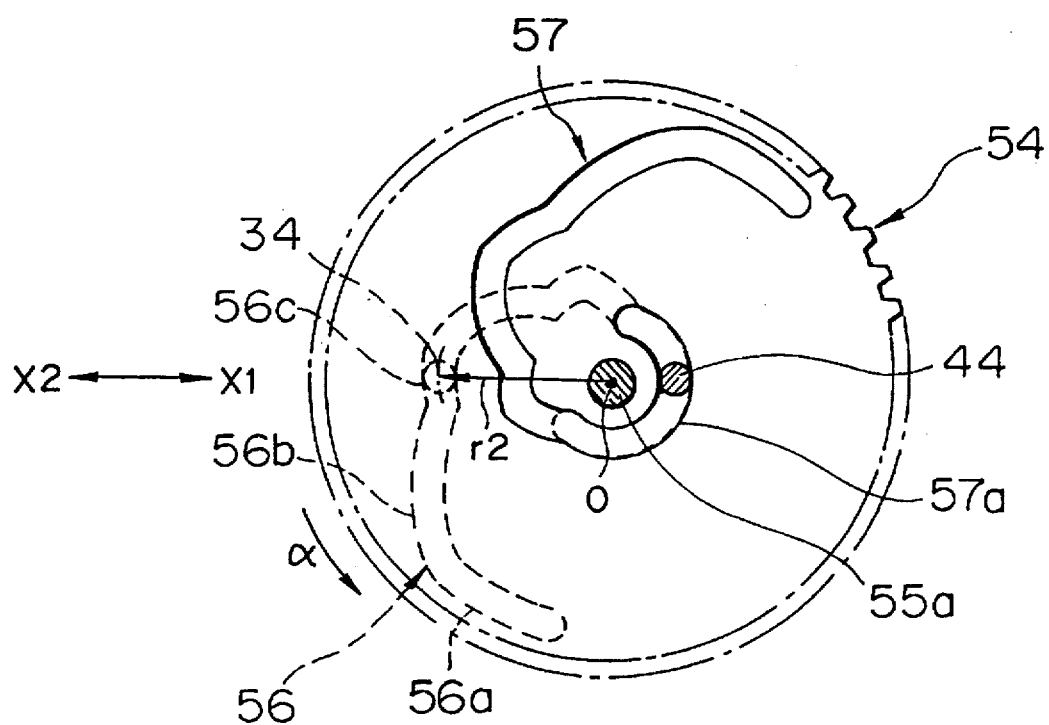
FIG. 4 is a plan view of the rotary member selecting a second tier.

While the rotary member 54 is rotating in the α (alpha) direction from the state shown in FIGS. 3A and 3B to the state shown in FIG. 4, the slide protrusion 34 is guided in the X1 direction by the drive portion 56b of the first cam portion 56. As a result, the first drive member 30 is driven in the X1 direction. At the same time, the first inclined guide portions 32a provided in the first drive member 30 are moved in the X1 direction from the position indicated by the broken lines shown in FIG. 2 to the position shown in FIG. 6, and the support rods 25 are guided by the inclined guide portions 32a and moved down in the Y1 direction along the elongated support holes 12. When the rotary member 54 has rotated to the position shown in FIG. 4, the support rods 25 reach the position indicated by (ii) in FIGS. 2 and 6. At that time, the cartridge holder 24 of the drive unit 20 faces the holding area A2 of the second tier.

Figure 6:
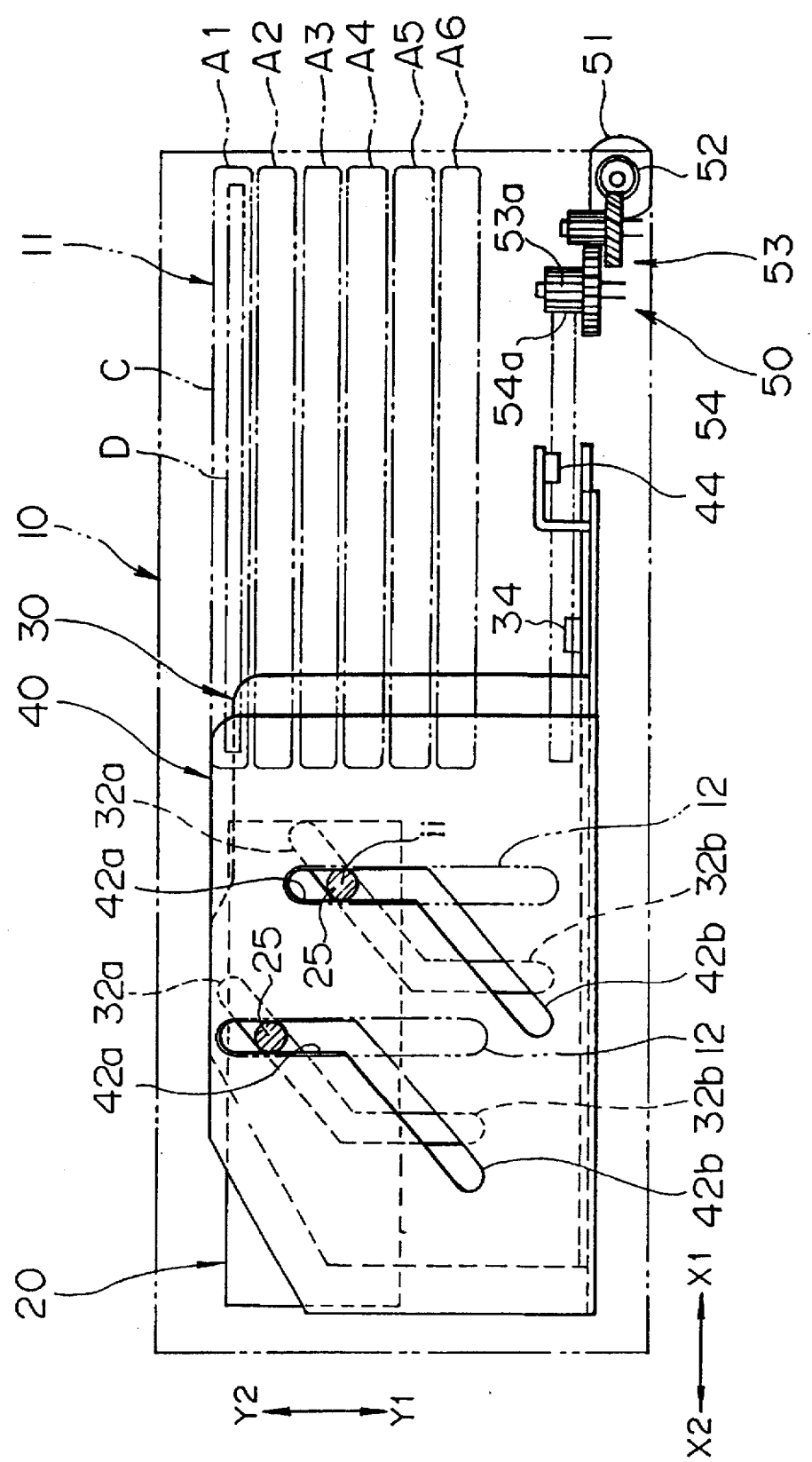
FIG. 6 is a side elevated view of a chassis showing a state where a second tier is selected.

When the rotary member 54 stops at the position shown in FIG. 4, the slide protrusion 34 is located at the arched portion 56c of the second tier (see FIG. 4). Since the arched portion 56c is coincident with the arched locus of the radius r2 with respect to the center O, the slide protrusion 34 is confined to the position shown in FIG. 4 in the X1–X2 directions. Thus, there is no movement of the first drive member 30 and the drive unit 20 is positioned where it can select the cartridge C in the holding area A2 of the second tier. FIG. 6 illustrates a state wherein the drive unit 20 has stopped at the position where it can select the cartridge C in the holding area A2 of the second tier.

Figure 5:
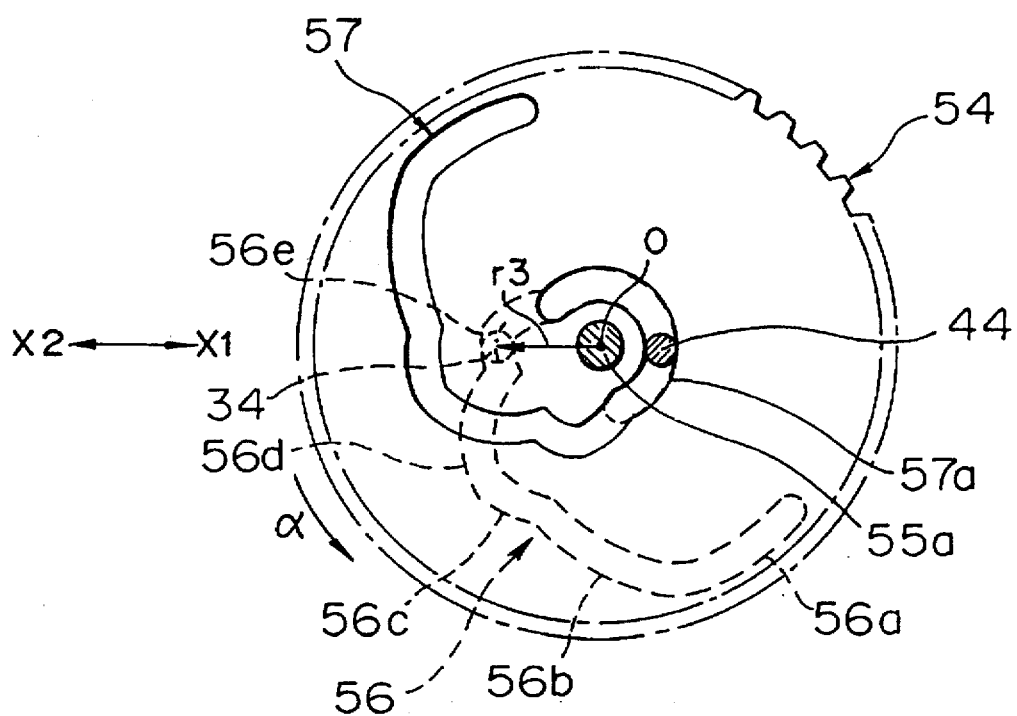
FIG. 5 is a plan view of the rotary member selecting a third tier.

As the rotary member 54 is rotated from the state shown in FIG. 4 to the state shown in FIG. 5, the slide protrusion 34 is driven in the X1 direction by the drive portion 56d of the first cam portion 56 to the arched portion 56e corresponding to the third tier, and the first drive member 30 is thereby driven in the X1 direction. When the slide protrusion 34 has reached the arched portion 36e of the third tier, the support rods 25 have been moved down to the position indicated by (iii) in FIG. 2 by the first inclined guide portions 32a. When the support rods 25 are at the position (iii), the cartridge holder 24 of the drive unit 20 faces the holding area A3 of the third tier. When the rotary member 54 is stopped at the state shown in FIG. 5, the slide protrusion 34 stays in the arched portion 56e of the third tier. Since the arched portion 56e of the third tier is coincident with the arched locus of the radius r3 with respect to the center O, the slide protrusion 34 is confined to the arched portion 56e of the third tier. Thus, the first drive member 30 is also confined and the drive unit 20 is positioned where it can select the cartridge C in the holding area A3 of the disk container 11.

While the rotary member 54 is rotating from the state shown in FIG. 5 to the state shown in FIG. 8, the slide protrusion 34 is driven in the X1 direction by the drive portion 56f of the first cam portion 56 to the arched portion 56g. Since the arched portion 56g is formed by the arched locus of the radius r4 from the center O, there is no more movement of the slide protrusion 34 or the first drive member 30 in the X1 direction while the slide protrusion 34 is at the arched portion 56g.

Figure 7:
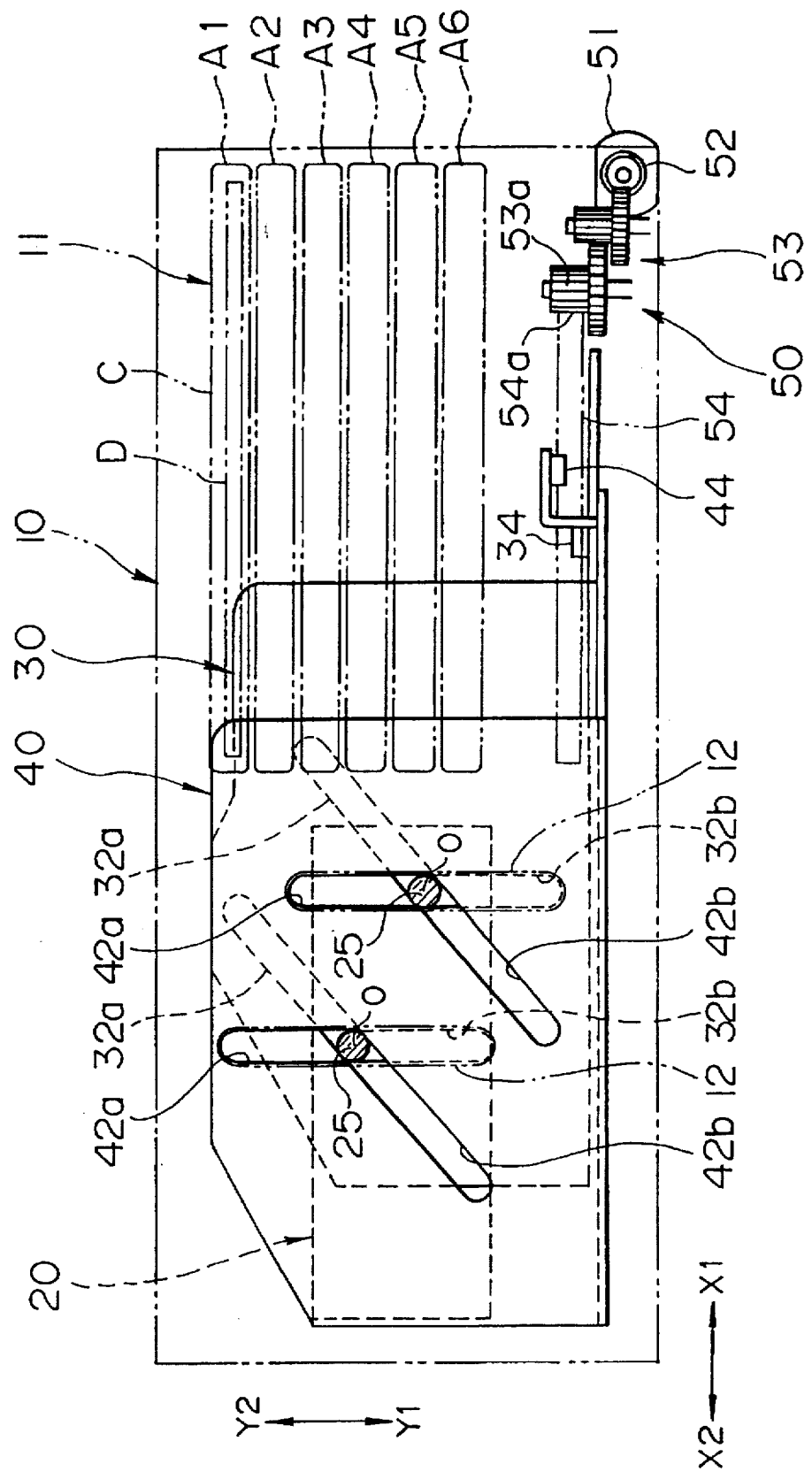
FIG. 7 is a side elevated view of the chassis showing transfer between inclined guide portions.

As shown in FIG. 8, immediately after the slide protrusion 34 has reached the arched portion 56g, the slide protrusion 44 of the second drive member 40 is still in the arched portion 57a formed as the arched locus of the same radius r4. FIG. 7 illustrates the position of the first drive member 30 and that of the second drive member 40 when the rotary member 54 has the rotational position shown in FIG. 8. In the state shown in FIG. 7, the first releasing portions 32b of the first drive member 30, which has moved in the X1 direction and stopped, are coincident with the elongated support holes 12. The first inclined guide portions 32a are substantially coincident with the second inclined guide portions 42b of the second drive member 40 which is also at a stop.

At this time, the support rods 25 are at (0) (see FIG. 7) which are the lowermost ends of the first inclined guide portions 32a of the first drive member 30 and at the same time the uppermost ends of the second inclined guide portions 42b of the second drive member 40, i.e., guide portions 32a and 42b are continuous and transfer of the support rods 25 from the first inclined guide portions 32a to the second inclined guide portions 42b is possible. When the support rods 25 are at the positions (0) shown in FIG. 7, the drive unit 20 is midway between the selection position from the holding area A3 of the disk container 11 and the selection position for the holding area A4 of the disk container. That is, the state illustrated in FIG. 7 is a state wherein the drive unit 20 is not selecting a cartridge in any holding area. Thus, there is no stop of the rotary member 54 in the state shown in FIG. 8.

After the rotary member 54, which is rotating in the α (alpha) direction has passed the position shown in FIG. 8, the slide protrusion 34 of the first drive member 30 slides in the arched portion 56g formed in the arched locus of the fixed radius r4 and the first drive member 30 remains stopped at the position shown in FIG. 7. When the first drive member 30 is in this stopped state, the first releasing portions 32b are coincident with the elongated support holes 12. Thus, when the rotary member 54 further rotates in the α (alpha) direction beyond the state shown in FIG. 8, the first releasing portions 32b continue to allow for movement of the support rods, i.e., the drive unit 20, in the Y1 direction.

While the rotary member 54 is rotating in the α (alpha) direction beyond the state shown in FIG. 8, the slide protrusion 44 of the second drive member 40 passes through the arched portion 57a of the second cam portion 57 and is driven by the drive portion 57b in the X1 direction. During that time, the support rods 25 are received by the second inclined guide portions 42b of the second drive member 40, and moved downward in the Y1 direction along the elongated support holes 12 (and the first releasing portions 32b), as the second inclined guide portions 42b move in the X1 direction FIG. 10 illustrates a state where the slide protrusion 44 is positioned in the arched portion 57c of the second cam portion 57. When the rotary member 54 stops at the position shown in FIG. 10, the slide protrusion 44 stops in the arched portion 57c corresponding to the fourth tier of disk container 11 formed as the arched locus of the radius r3 with respect to the center O. If the outer diameter of the slide protrusion 44 and the width of the groove of the second cam portion 57 are formed with a high degree of accuracy, the slide protrusion 44 does not shift but is retained in the X1-X2 directions by the arched portion 57c in the state shown in FIG. 10. Consequently, backlash and jerking of the second drive member 40 in the X1-X2 directions is prevented, and the support rods 25 are positioned at the position indicated by (iv) in FIG. 9. In the state shown in FIG. 9, the drive unit 20 faces the holding area A4 of the fourth tier of the disk container 11 so that the cartridge C therein can be selected.

Figure 11:
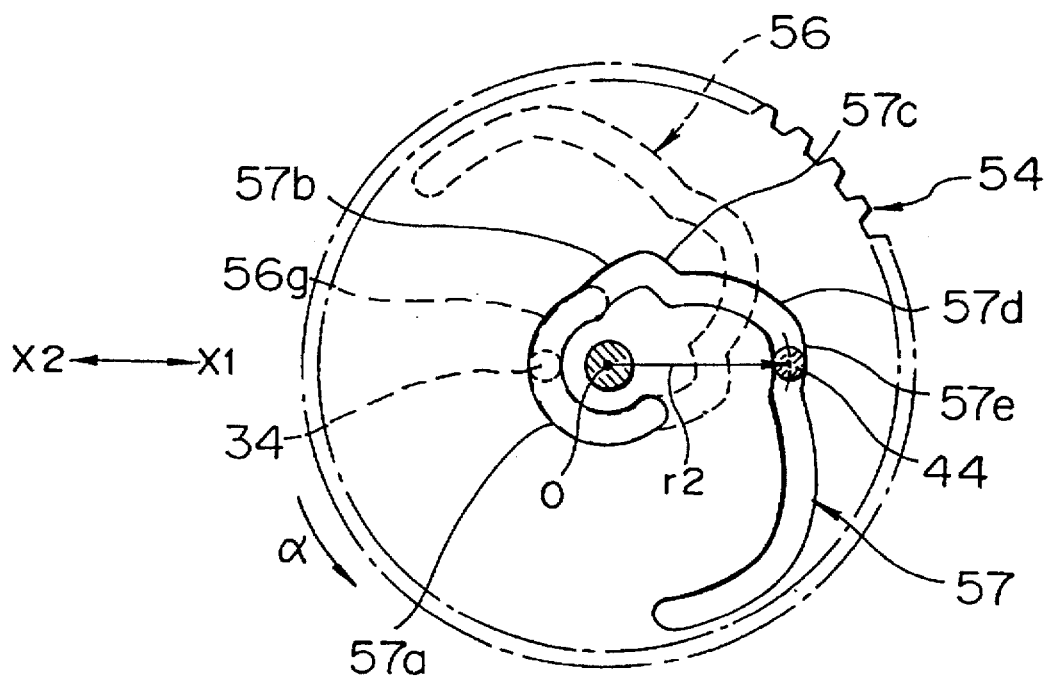
FIG. 11 is a plan view of the rotary member showing a state where a fifth tier is selected.
Figure 12:
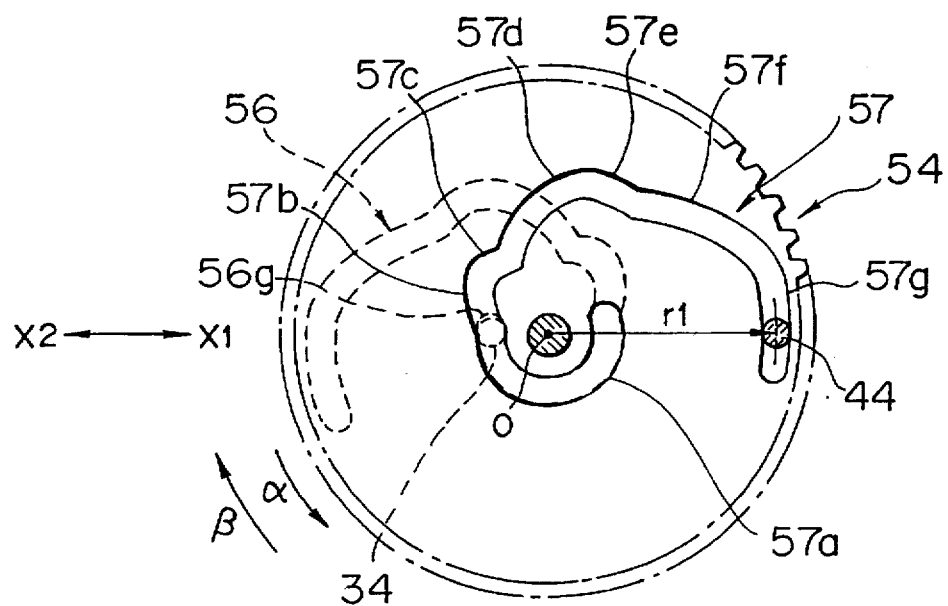
FIG. 12 is a plan view of the rotary member showing a state where a sixth tier is selected.

As the rotary member 54 rotates further in the α direction, the slide protrusion 44 is guided by the drive portion 57d of the second cam portion 57 to the arched portion 57e corresponding to the fifth tier of the disk container 11, and the state illustrated in FIG. 11 is obtained. At that time, the support rods 25 are moved down to the position indicated by (v) in FIG. 9 by the second inclined guide portions 42b. When the rotary member 54 stops at the position shown in FIG. 11, the slide protrusion 44 is confined to the arched portion 57e of the fifth tier, and the drive unit 20 is thereby positioned where it can select the cartridge C in the holding area A5 of the disk container 11.

Figure 9:
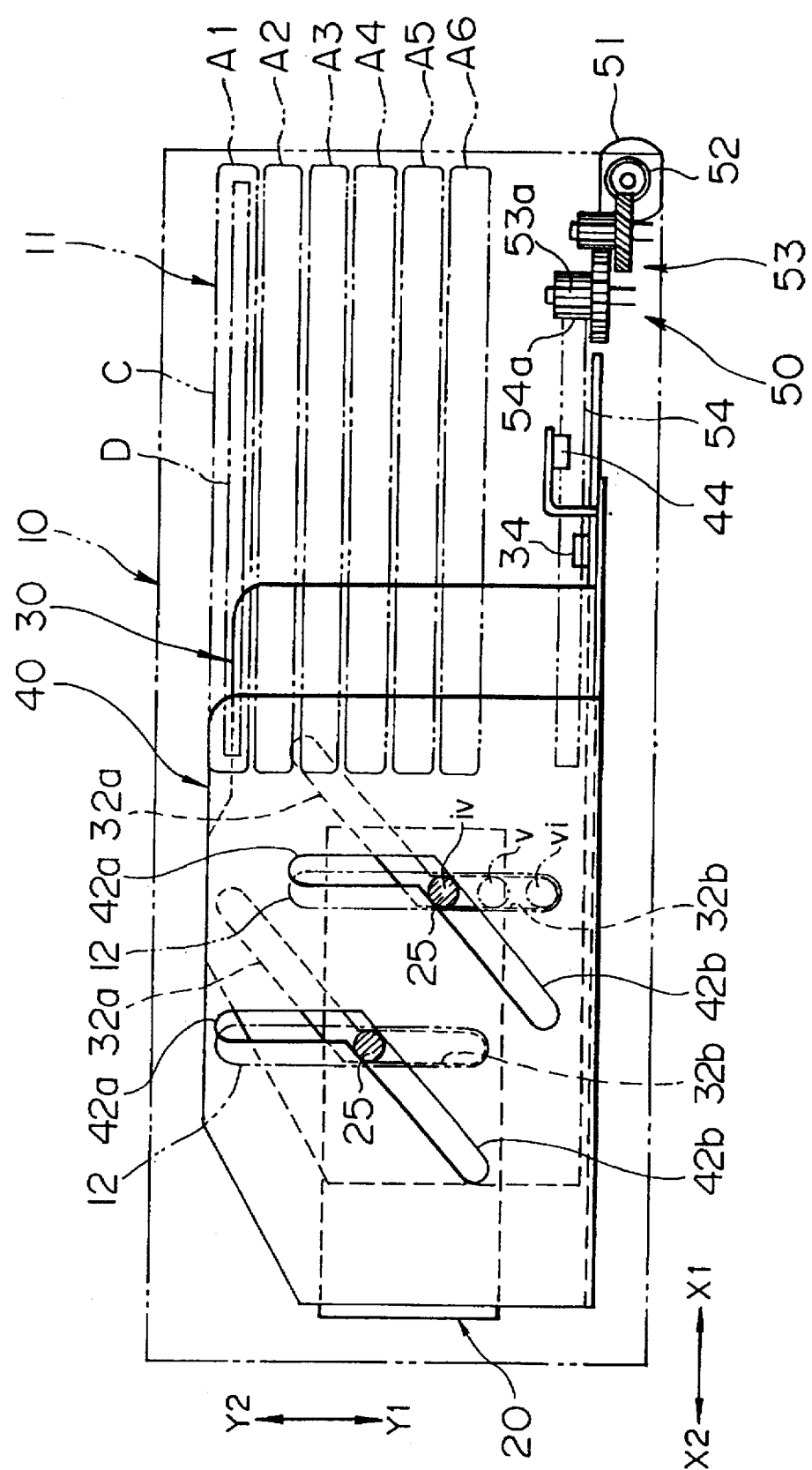
FIG. 9 is a side elevated view of the chassis showing a state where a fourth tier is selected.
Figure 10:
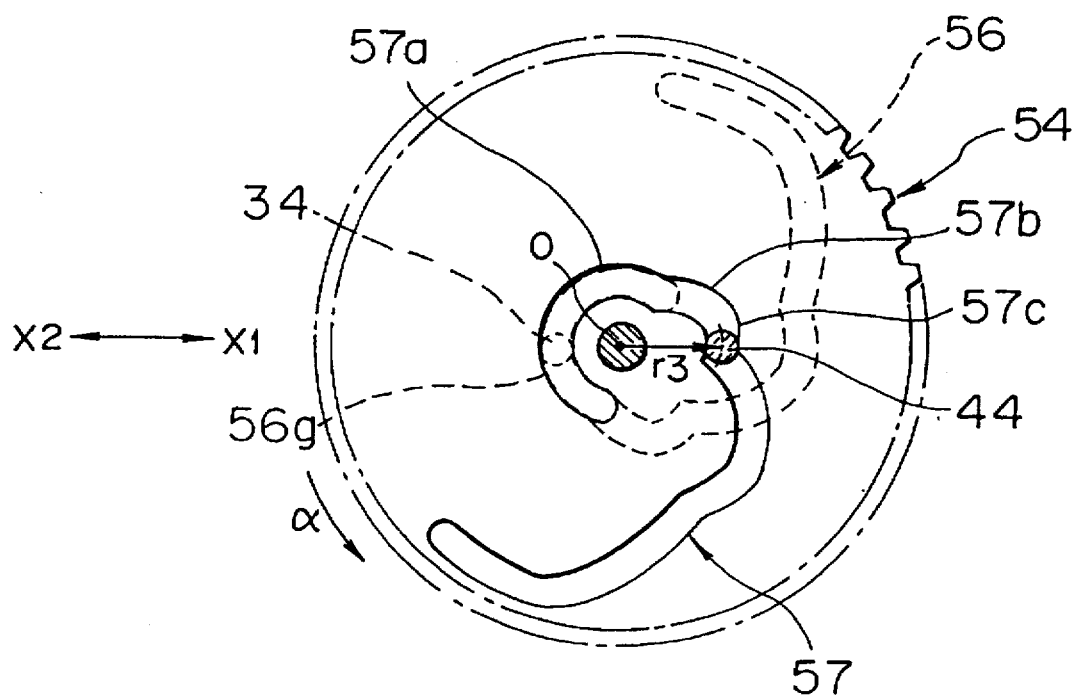
FIG. 10 is a plan view of the rotary member showing a state where the fourth tier is selected.

As the rotary member 54 rotates further in the α (alpha) direction to obtain the state shown in FIG. 12, the slide protrusion 44 reaches the arched portion 57g, corresponding to the sixth tier of disk container 11, of the second cam portion 5, and the support rods 25 are thereby guided to the lowermost tier indicated by (vi) in FIG. 9 by the second inclined guide portions 42b. When the rotary member 54 stops in the state shown in FIG. 12, the drive unit 12 is positioned where it can select the cartridge C in the holding area A6 of the sixth tier of disk container 11.

The operation for moving the drive unit 20 in an upward direction (the Y2 direction) is the reverse of the above-described operation. That is, the rotary member 54 is rotated in the β direction starting from the state shown in FIG. 12.

In the above-described series of operations, the first drive member 30 first moves from the position shown in FIG. 2 in the X1 direction by a distance La, and then stops. Thereafter, the second drive member 40 moves from the position shown in FIG. 2 in the X1 direction by the same distance La, and then stops. The drive unit 20 can thus be selectively moved from the selection position for the holding area A1 of the first tier to the holding area A6 of the sixth tier by the movement of the respective drive members 30 and 40 by the distance La starting from the position shown in FIG. 2.

Further, the cam portions 56 and 57 position the drive unit 20, which has moved to the selection position where it can select the cartridge (the recording medium) of any one of the holding areas A1–A6. That is, when the slide protrusion 34 is confined to any of the arched portions 56a, 56c and 56e of the first cam portion 56, the drive unit 20 is positioned opposite any one of the holding areas A1–A3. When the slide protrusion 44 is confined to any of the arched portions 57c, 57e and 57g of the second cam portion 57, the drive unit 20 is positioned at any one of the holding areas A4–A6.

Figure 20:
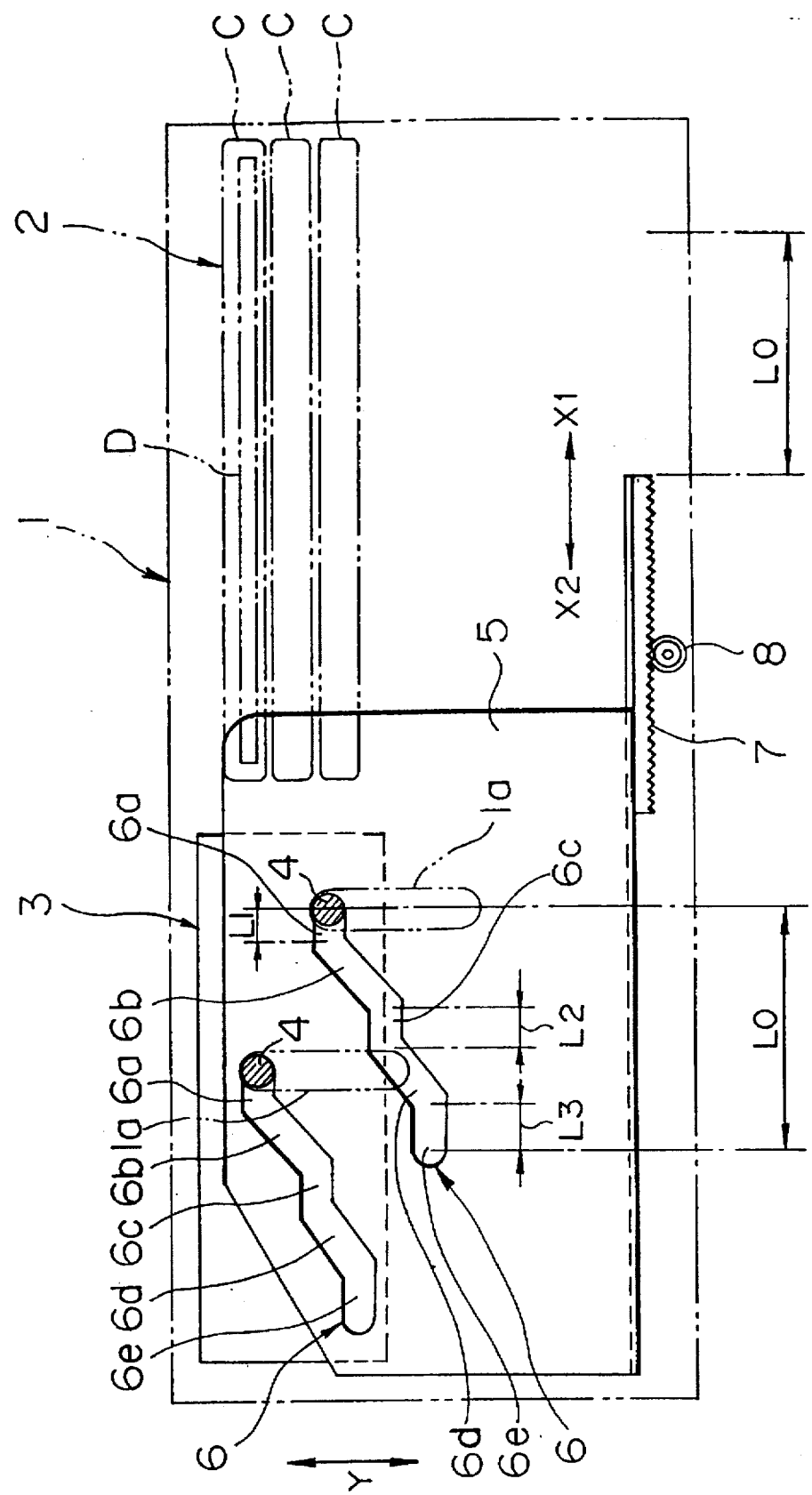
FIG. 20 is a side elevated view of a conventional disk apparatus.

Thus, it is not necessary for the inclined guide portions 32a and 42b to include the parallel portions 6a, 6c and 6e for each tier or holding area of the disk container 11, such as is required in the prior art drive apparatus shown in FIG. 20, and the movement distance La of each of the drive members 30 and 40 does not include the movement distances L1, L2 and L3 of the prior art system in FIG. 20. Accordingly, each of the movement distances La of the first and second drive members 30 and 40, each guiding the drive unit to the three holding areas, is much shorter than the movement distance L0 of the drive lever 5 of the prior art shown in FIG. 20. Consequently, the movement distances of the drive members 30 and 40 in the chassis 10 can be reduced and an effective layout of the mechanisms in the chassis 10 is possible.

Assuming that there are six selection positions to which the drive unit of the conventional drive apparatus shown in FIG. 20 is to be moved, the length L0 of the guide hole 6 will be twice La plus the sum of L1, L2 and L3 and it is almost impossible to move the drive member through such a long distance within confines of a typical chassis 10.

In the above embodiment of the invention, each of the drive members 30 and 40 moves through a short distance La within the chassis 10, and the movement area for the same number of waiting positions is less than half the movement area of the conventional apparatus shown in FIG. 20. Thus, the number of recording media, i.e., cartridges C, to be housed in the chassis 10 and the casing can be increased, and selection of all the cartridges becomes possible.

In the above discussed embodiment of the invention, the first cam portion 56 for driving the first drive member 30 and the second cam portion 57 for driving the second drive member 40 are formed on the front and rear surfaces of the single rotary member 54 provided in the drive mechanism 50. Thus, there is only one rotary member 54 that must be rotated by the drive mechanism 50, and the structure of the apparatus is simplified. Further, it is possible to detect whether or not the drive unit 20 has reached the waiting position for any of the holding areas A1–A6 by detecting the rotational angle of the single rotary member 54 by an angle detector mechanism (not shown). That is, it is possible to readily perform control of the movement position of the drive unit 20 by detecting and controlling only the rotational phase of the single rotary member 54.

Furthermore, in the above discussed embodiment of the invention, the first cam portion 56 for driving the first drive member 30 and the second cam portion 57 for driving the second drive member 40 are formed on the front and back of the single rotary member 54 provided in the drive mechanism 50 symmetrically in the direction of movement of the drive members (the X1–X2 directions) with respect to the center O of the rotary member 54. Thus, machining of the two cam portions 56 and 57 in the rotary member 54 is simplified. Further, the distance through which the drive unit 20 is moved to the selection positions when the rotary member 54 is rotated from 0 to 180 degrees is the same as the distance through which the drive unit 20 is moved to the selection positions when the rotary member 54 is rotated from 180 degrees to 360 degrees. Thus, control of the movement position of the drive unit 20, performed on the basis of detection of the rotational angle of the rotary member 54, is simplified.

Further, as shown in FIG. 3, in the first and second cam portions 56 and 57, the curvature of the portions of the groove connecting the arched portions and the drive portions is large compared to the curvature of the connecting portion between the inclined guide portion 6b and the parallel portion 6c shown in FIG. 20. Accordingly, the load applied to the rotary member 54 when the slide protrusion 34 is in the first cam portion 56 from the drive portion 56b to the arched portion 56c does not vary greatly. Consequently, the drive member is driven smoothly, and wear, which would occur due to variations in the load in prior art systems, is prevented at the meshing portion of the gears.

Further, in the above-described embodiment, the first and second drive members 30 and 40 provide three selection positions to which the drive unit is moved by the inclined guide portions 32a or 42b formed in the first or second drive member 30 or 40. However, in another embodiment of the invention, a single drive member may be provided so that the drive unit can be moved on the selection axis by an inclined guide portion provided in that drive member. In this embodiment, since the distance through which the drive member is moved relative to the selection movement for the single tier of the recording medium is shorter than that of the prior art apparatus shown in FIG. 20, the drive member is moved by the same distance as, for example, the movement distance L0 shown in FIG. 20 and the drive unit may be moved to the selection positions for four or five recording media In another embodiment of the invention (not shown), the inclined guide portions are provided in the drive unit 20 while a guide portion, such as a rod or a protrusion, guided by inclined guide portion is provided on the drive member.

A second embodiment of the invention will now be described with reference to FIGS. 13 to 19.

Figure 13:
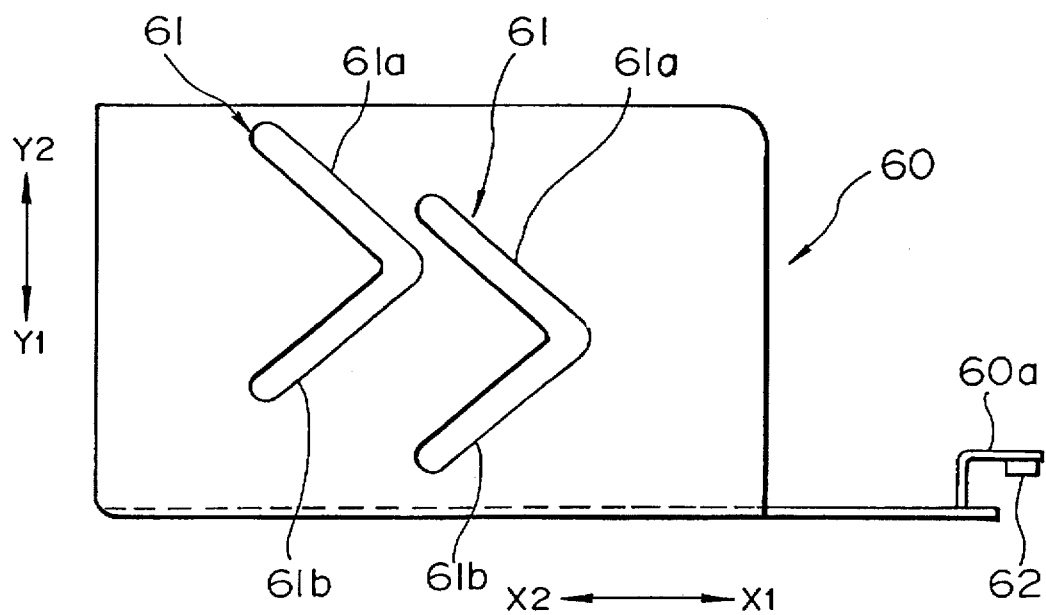
FIG. 13 is a side elevated view showing a drive member of a second embodiment according to the present invention.
Figure 14:
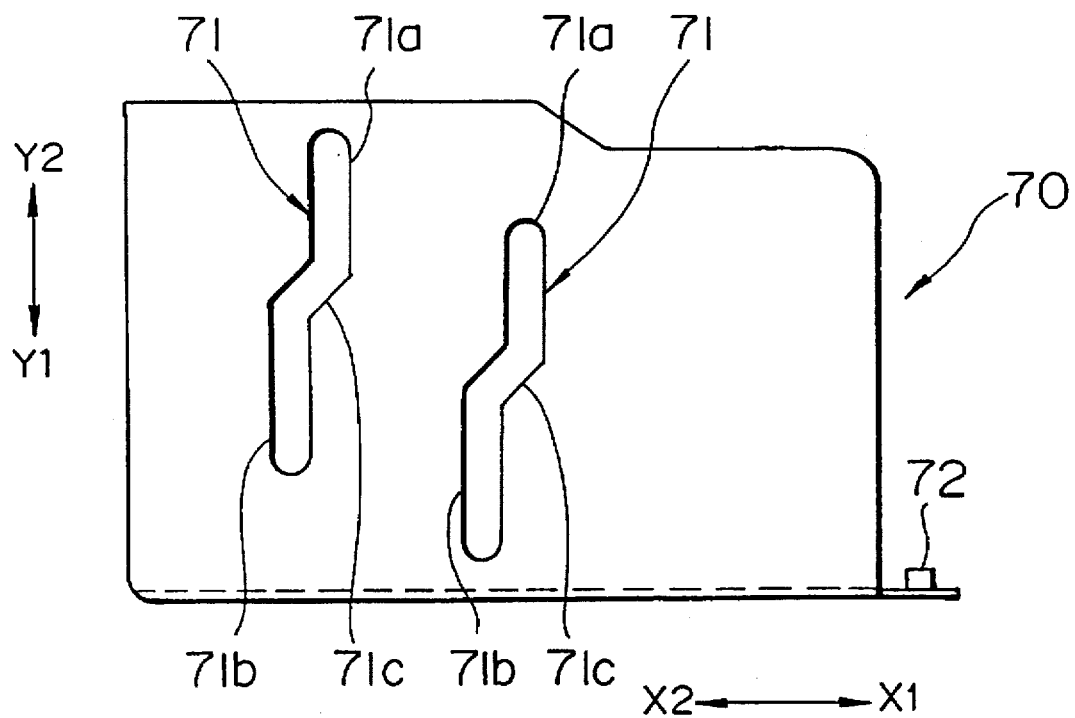
FIG. 14 is a side elevated view showing a switching guide member of the second embodiment of the invention.
Figure 15A:
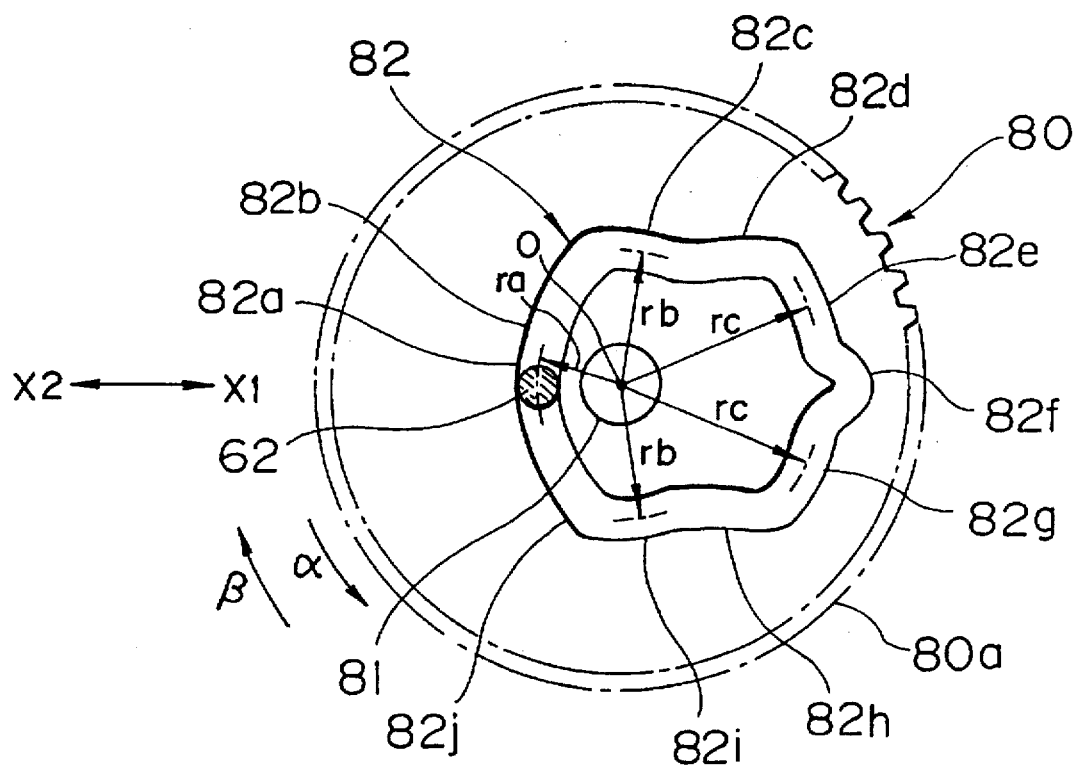
FIG. 15A is a plan view of the rotary member showing a first cam portion of the second embodiment.
Figure 15B:
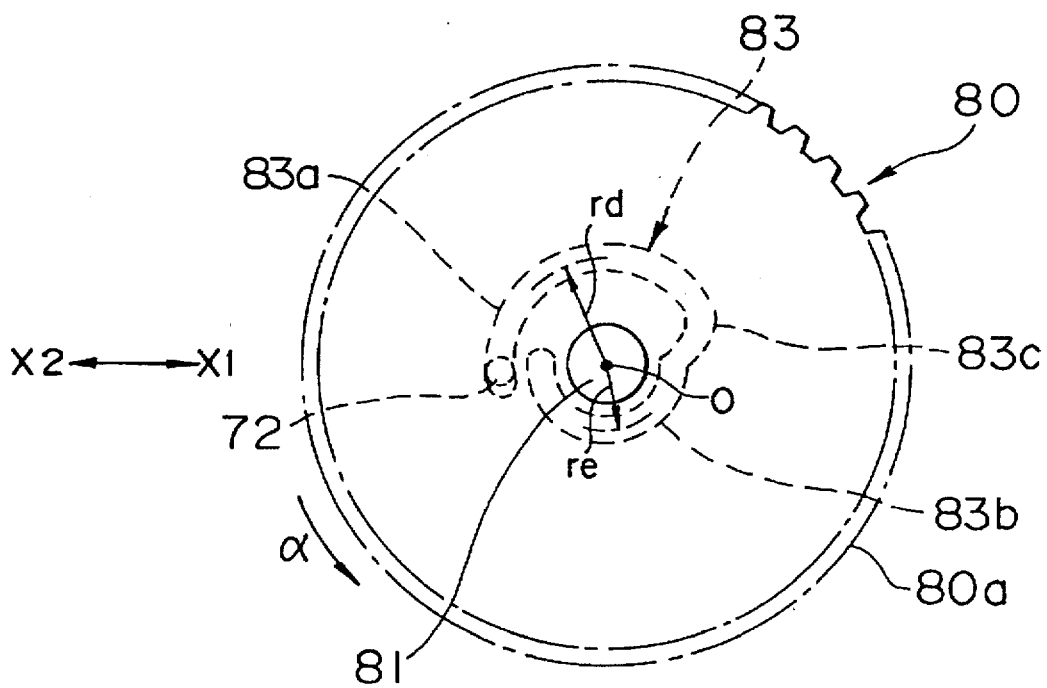
FIG. 15B is a plan view of the rotary member showing a second cam portion.

This embodiment differs from the embodiment shown of FIG. 1 in that a drive member 60, shown in FIG. 13, is used in place of the second drive member 40 shown in FIG. 1. Also a switching guide member 70 shown in FIG. 14 is used in place of the first drive member 30 shown in FIG. 1. Additionally, a rotary member 80 shown in FIGS. 15A and 15B is used in place of the rotary member 54 provided in the drive mechanism 50. The remaining structure of this embodiment of the invention is the same as that of the structure shown in FIG. 1 and the discussion of those structures above is equally applicable here.

As shown in FIG. 13, the drive member 60 has a pair of V-shaped guide holes 61. An upper half of each of the V-shaped guide holes 61 forms an outward inclined guide portion 61a which is inclined leftward in FIG. 13, and a lower half, constituting a return inclined guide portion 61b, which is declined leftward in FIG. 13.

Figure 16:
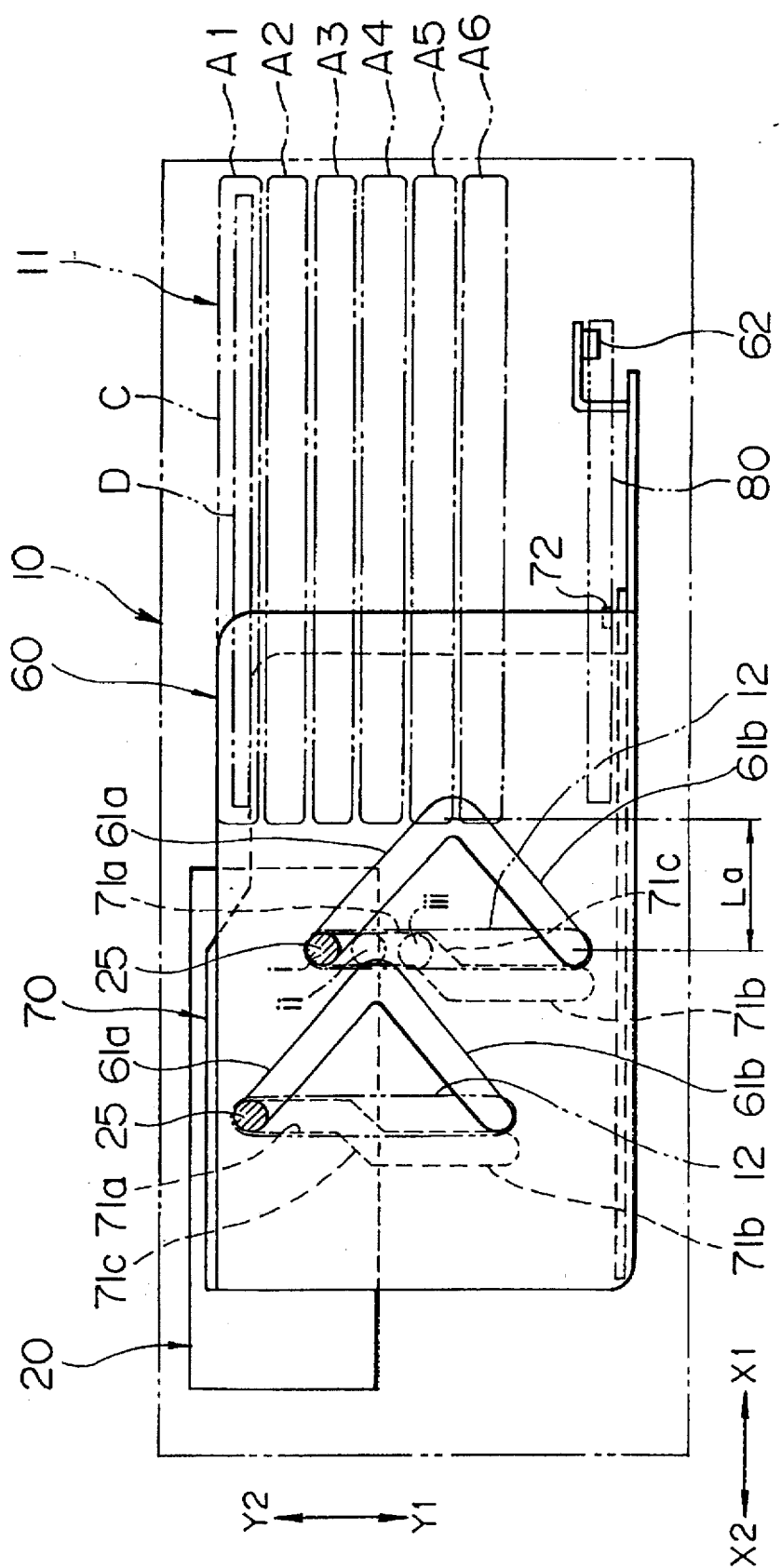
FIG. 16 is a side elevated view of the chassis showing a state where a first tier is selected in the second embodiment of the invention.
Figure 17:
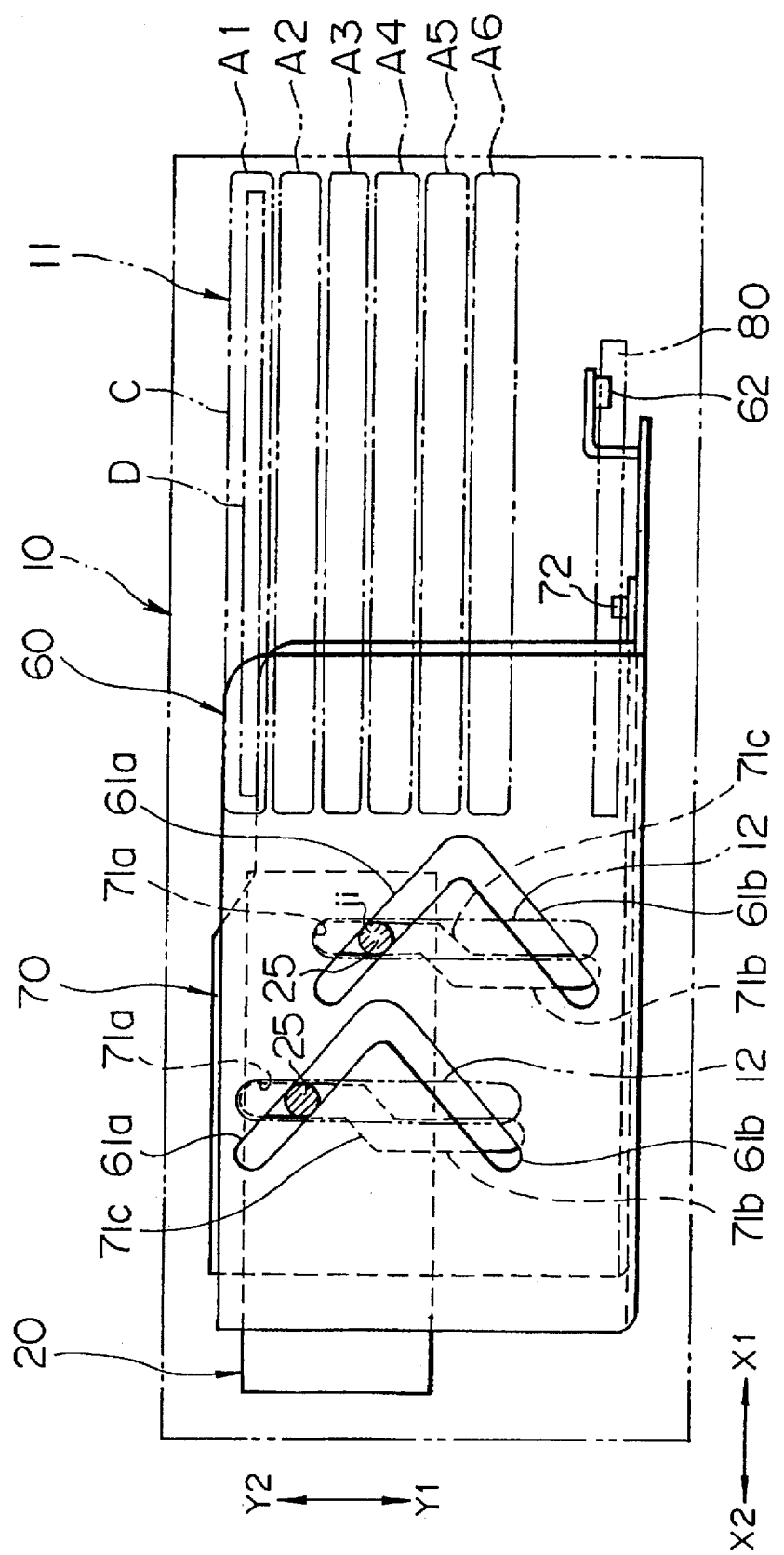
FIG. 17 is a side elevated view of the chassis showing a state where a second tier is selected in the second embodiment of the invention.

The switching guide member 70 (see FIG. 14) has a pair of switching guide passages 71 shaped in an elongated zig-zag. Each of the switching guide passages 71 has an upper guide portion 71a and a lower guide portion 71b. As shown in FIG. 16, the guide portions 71a and 71b are formed parallel to each other on the selection axis (the Y1–Y2 directions) and are offset in the directions of movement of the drive member 60 (the X1–X2 directions). An inclined switching guide portion 71c connects the guide portions 71a and 71b and provides the offset between guide portions 71a and 71b on the horizontal axis.

Like the first and second drive members 30 and 40 shown in FIG. 1, the drive member 60 and the switching guide member 70 are supported to be movable independently in the X1–X2 directions relative to the chassis 10. The support rods 25 provided on the unit base 21 of the drive unit 20 shown in FIG. 1 pass through the switching passages 71 formed in the switching guide member 70, the guide holes 61 of the drive member 60 and then the elongated support holes 12 of the chassis 10.

The rotary member 80 shown in FIG. 15 is supported so as to rotate about a shaft 81 provided at the center of the rotary member 80. A toothed portion 80a provided on the periphery of the rotary member 80 meshes with the gear portion 80a of the pinion gear 53a of the final stage of the speed reduction gear train 53 of the drive mechanism 50 shown in FIG. 2, so that the rotary member 80 is rotated in either the α or β directions.

As shown in FIG. 15A, a grooved first cam portion 82 is formed in the upper surface of the rotary member 80 to guide a slide protrusion 62 provided on the under surface of an arm 60a of the drive member 60 (see FIG. 13). The first cam portion 82 has a loop-like shape which is symmetrical in the longitudinal (i.e., the X1–X2) direction of FIG. 15 with respect to a line which passes through the rotational center O and extends in the X1–X2 directions. Accordingly, while the rotary member 80 rotates through 360 degrees, the slide protrusion 62 (see FIG. 16) and the drive member 60 move first in the X2 direction and then back in the X1 direction.

The first cam portion 82 has arched portions 82a corresponding to the first and sixth tiers, a drive portion 82b, an arched portion 82c corresponding to the second tier, a drive portion 82d, an arched portion 82e corresponding to the third tier, a drive portion 82f for turning, an arched portion 82g corresponding to the fourth tier, a drive portion 82h, an arched portion 82i corresponding to the fifth tier, and a drive portion 82j. These individual portions are a continuously formed curving groove in the first cam portion 82. The centers of the widths of the arched portions 82a, 82c, 82e, 82g, and 82i are coincident with the arched loci of radii ra, rb, rc (at two locations) and rb with respect to the center O of the rotary member 80.

A grooved second cam portion 83, shown in FIG. 15B, is formed on the under surface of the rotary member 80. The second cam portion 83 has an arched portion 83a, an arched portion 83b, and a switching portion 83c. The arched portion 83a is formed on an arched locus of a radius rd from the center O which spreads over a range of less than 180 degrees. The arched portion 83b is formed on an arched locus of a radius re from the center O which spreads over a range of almost 180 degrees. The switching portion 83c is formed to connect the arched portion 83a with the arched portion 83b. A slide protrusion 72 provided on the upper surface of a bottom plate of the switching guide member 70 is guided by the second cam portion 83 (see FIG. 14).

When the rotary member 80 is rotating in the α direction over a first 180 degrees from the state shown in FIG. 15B, the slide protrusion 72 and the switching guide member 70 are moved in the X2 direction and retained there by the arched portion 83a, then slightly moved in the X1 direction by the switching portion 83c during further rotation in the α direction. During the second 180 degrees of rotation from the position shown in FIG. 15b the slide protrusion 72 and the switching guide member 70 are moved in X1 direction and retained there by the arched portion 83b.

The operation of the second embodiment of the invention will now be described.

When the rotary member 80 has the rotational position shown in FIGS. 15A and 15B with respect to the X1–X2 directions, the slide protrusion 62 of the drive member 60 is located in the arched portion 82a of the first cam portion 82 of the rotary member 80. At that time, the drive member 60 is at the furthest position in the X1 direction. Accordingly, the support rods 25 are located at the upper ends of the outward inclined guide portions 61a of the guide holes 61 of the drive member 60, and are at the uppermost positions indicated by (i) in the elongated support holes 12 of the chassis 10 (see FIG. 16). At this time, the drive unit 20 is positioned where it can select the cartridge C in the holding area A1 of the first tier of the disk container 11.

When the rotary member 80 is stationary in the state shown in FIG. 15, the slide protrusion 62, which is located in the arched portion 82a of the radius ra with respect to the center O, is held so that it does not move in the X1–X2 directions, as in the case of the embodiment shown in FIG. 3. Accordingly, the drive member 60 is confined and the support rods 25 are positioned at (i), thus positioning the drive unit 20 where it can select the cartridge C in the holding area A1 of the first tier.

At that time, the slide protrusion 72 provided on the switching guide member 70 is located in the arched portion 83a of the second cam portion 83 to allow the switching guide member 70 to be positioned at the furthest position in the X2 direction. Accordingly, the upper guide portions 71a of the switching guide passages 71 are coincident with the elongated vertical support holes 12 of the chassis 10, as shown in FIG. 16, and allow for the movement of the support rods 25, i.e., the drive unit 20, in the direction of selection, (i.e., the Y1 direction). The lower guide portions 71b are offset with respect to the elongated vertical support holes 12 in the X2 direction.

When the rotary member 80 is driven in the α direction by the motor 51 of the drive mechanism 50 from the state shown in FIG. 15, the slide protrusion 62 and the drive member 60 are driven in the X2 direction by the drive portion 82b of the first cam portion 82. When the slide protrusion 62 has reached the arched portion 82c corresponding to the second tier, the drive member 60 has moved to the position shown in FIG. 17. At this time, the support rods 25 are moved down in the Y1 direction along the elongated vertical support holes 12 and the upper guide portions 71a by the outward inclined guide portions 61a provided in the drive member 60. When the rotary member 80 stops after the slide protrusion 62 has moved to the arched portion 82c of the second tier, the slide protrusion 62 is confined by the arched portion 82c and the support rods 25 are held at positions indicated by (ii) in FIG. 17. As a result the drive unit 20 is positioned where it can select the cartridge C in the holding area A2 of the second tier of the disk container 11.

When the rotary member 80 rotates further in the α direction and then stops when the slide protrusion 62 has reached the arched portion 82e corresponding to the third tier, the slide protrusion 62 is similarly confined by the arched portion 82e. During that time, the drive member 60 is further moved in the X2 direction and the support rods 25 are held at the position indicated by (iii) in FIG. 16. At this time, the drive unit 20 is positioned where it can select the cartridge C in the holding area A3 of the third tier.

As the rotary member 80 rotates further in the α (alpha) direction, the slide protrusion 62 passes through the drive portion 82f for turning in the first cam portion 82. While the slide protrusion is passing through the drive portion 82f, the direction of movement of the slide protrusion 62 is switched from the X2 direction to the X1 direction and the slide protrusion 62 and the drive member 60 are moved in the X1 direction. Immediately before the direction of movement of the slide protrusion 62 is switched from the X2 direction to the X1 direction by the drive portion 82f, the slide protrusion 72 provided on the switching guide member 70 reaches the arched portion 83b through the switch over portion 83c. At that time, the switching guide member 60 is driven through a small distance in the X1 direction.

Figure 18:
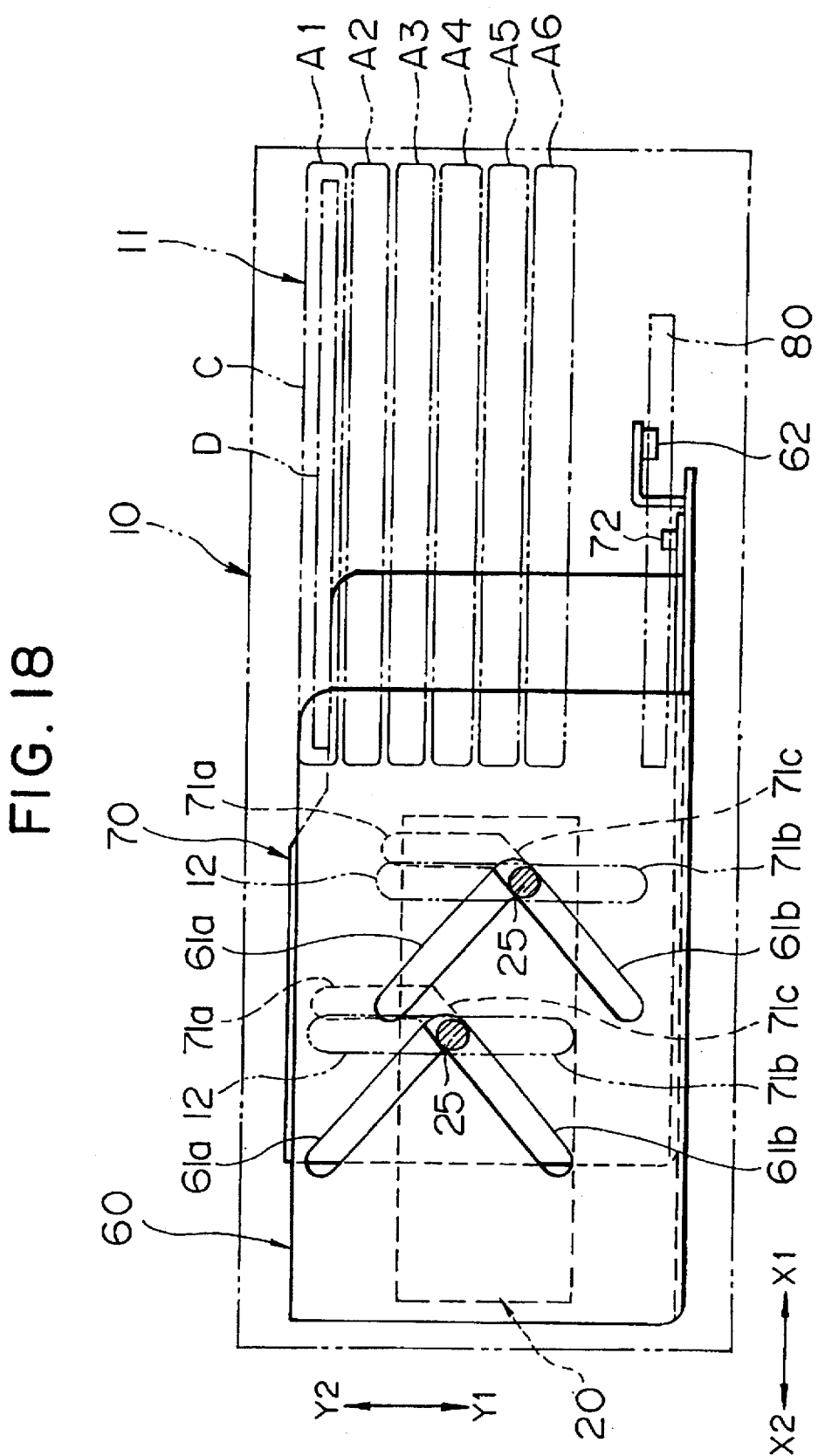
FIG. 18 is a side elevated view of the chassis showing the transfer between an outward inclined guide portion and a return inclined guide portion in the second embodiment of the invention.

FIG. 18 illustrates a state when the slide protrusion 62 has moved to the apex portion of the drive portion 82f of the first cam portion 82 and the slide protrusion 62 and the drive member 60 have reached the turning point from the X2 direction to the X1 direction. At that time, the support rods 25 are on the boundaries between the outward inclined guide portions 61a and the return inclined guide portions 61b of the guide holes 61. As mentioned above, at this time the slide protrusion 72 and the switching guide member 70 have been moved through a small distance in the X1 direction by the switching portion 83c of the second cam portion 83 immediately before the state shown in FIG. 18 is obtained. Accordingly, in the state shown in FIG. 18, the upper guide portions 71a of the switching guide passages 71 of the switching guide member 70 are offset from the elongated vertical support holes 12 in the X1 direction, and the lower guide portions 71b are coincident with the elongated vertical support holes 12. Consequently, it is impossible for the support rods 25 to return to the outward inclined guide portions 61a. At the same time, the lower guide portions 71b allow for the movement of the support rods 25, i.e., the drive unit 20, in the Y1 direction.

While the drive member 60 is moving in the X1 direction from the position shown in FIG. 18, the support rods 25 are guided by the return inclined guide portions 61b and move along the elongated vertical support holes 12 and the lower guide portions 71b, whereby the drive unit 20 is moved down. When the rotary member 80 rotates further in the α direction and stops in a state wherein the slide protrusion 62 has moved to the arched portion 82g corresponding to the fourth tier, the slide protrusion 62 is confined to the arched portion 82g and the support rods 25 are held at the positions indicated by (iv) in FIG. 19 by the return inclined guide portions 61b of the drive member 60. At that time, the drive unit 20 is positioned to select the cartridge C located in the holding area A4 of the fourth tier of disk container 11.

Figure 19:
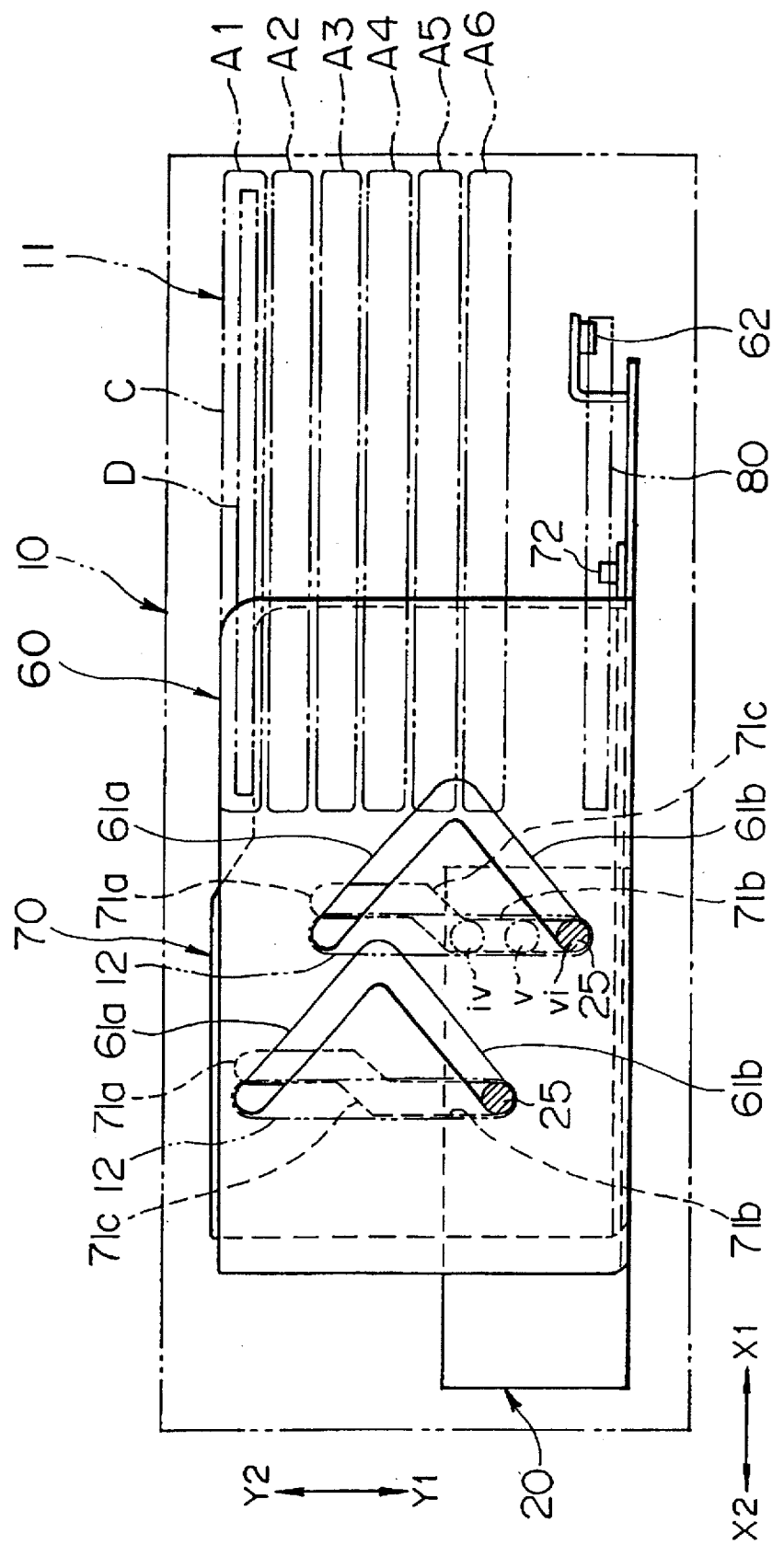
FIG. 19 is a side elevated view of the chassis showing a state where a sixth tier is selected in the second embodiment of the invention.

When the rotary member 80 rotates further in the α (alpha) direction and stops in a state where the slide protrusion 62 has reached the arched portion 82i of the fifth tier, the support rods 25 are held at the positions indicated by (v) in FIG. 19, whereby the drive unit 20 is positioned where it can select the cartridge C in the holding area A5 of the fifth tier.

When the rotary member 80 has rotated through 360 degrees and the slide protrusion 62 has returned to the arched portion 82a corresponding to the sixth tier, the drive member 60 reaches the end of its moving path in the X1 direction. At that time, the support rods 25 have been moved down to the lowermost ends indicated by (vi) in FIG. 19 by the return inclined guide portions 61b, as shown in FIG. 19, whereby the drive unit 20 stops and is positioned where it can select the cartridge C in the holding area A6 of the sixth tier of disk container 11.

When the drive unit 20 is moved up along the selection axis indicated by Y2, the rotary member 80 is rotated in the β direction, and the drive member 60 and the switching guide member 70 are operated in a manner reverse to the above-described operation.

In this embodiment, the movement range of the drive member 60 within the chassis 10, which enables the drive unit 20 to be moved to the selection positions for six cartridges C, is a reciprocative movement range having a distance indicated by La. Thus, many cartridges C can be held in the relatively small chassis 10.

In the second embodiment, as in the case of the first embodiment, since the single rotary member 80 is used to achieve a timed control of the drive member 60 and the switching guide member 70, the structure of the drive mechanism 50 can be simplified. Further, control of the movement of the drive unit 20 to the individual holding area is facilitated by, for example, detecting the rotational angle of the rotary member 80.

All the guide portions in the first and second embodiments of the invention are shown as elongated holes. Alternative embodiments of the invention can employ grooved guide portions.

Similarly, the switching guide portion of the second embodiment is shown as having the upper guide portion 71a with the lower guide portion 71b located below the upper guide portion 71a in the selection directions of the drive unit 20 and the inclined switching guide portion 71c which connects the upper guide portion 71a to the lower guide portion 71b. However, alternative embodiments of the invention can employ a switching guide portion made of, for example, a plate spring which changes the movement path of part (e.g., support rods 25) of the drive unit between the inclined guide portions 61a and 61b.

In the first embodiment, the first and second drive members 30 and 40 may also be driven by separate drive mechanisms or cams in the X1–X2 directions. In the second embodiment, the drive member 60 and the switching guide member 70 may also be driven by separate drive mechanisms or cams.

Similarly, while the cam portions 56, 57, 82 and 83 are shown as cam grooves, alternate embodiments of the invention can include cam portions which are rail cams or cams each guiding a follower at an outer periphery thereof.

While the recording media to be selected by the embodiments of the invention discussed above are disks, each housed in a cartridge C, alternative embodiments of the invention can accommodate disks not housed in a cartridge C, such as, optical disks, magneto-optical disks and magnetic disks.

This disclosure is illustrative and not limiting; further modifications will be apparent to one skilled in the art and are intended to fall within the scope of the invention as set forth in the appended claims.

What is claimed is:

1. A recording medium selection and drive apparatus comprising:

a chassis having first and second opposing side plates, each of the first and second plates defining a first elongated groove aligned parallel to a first axis and a second elongated groove aligned parallel to a second axis, the second axis being perpendicular to the first axis;

a container mounted between the first and second plates, the container including a plurality of holding areas, each holding area formed to receive a recording medium, the plurality of holding areas being arranged suck that received recording media are stacked in a direction parallel to the first axis;

a first drive member coupled to the second grooves defined in the first and second plates of the chassis such that the first drive member is restricted to move in a direction parallel to the second axis, the first drive member having opposing plates defining third elongated grooves, each of the third grooves having an inclined portion aligned in a direction diagonal to the first and second axis;

a second drive member coupled to the second grooves defined in the first and second plates of the chassis such that the second drive member is restricted to move in a direction parallel to the second axis, the second drive member having opposing plates defining fourth elongated grooves, each of the fourth grooves having an inclined portion aligned in a direction diagonal to the first and second axis;

a drive unit for driving a selected recording medium removed from a predetermined holding area of the container, the drive unit including support rods received in the first grooves defined in the first and second plates of the chassis such that the drive unit is movable in a direction parallel to the first axis, each of the support rods also being received in one of the third grooves and one of the fourth grooves defined by the first and second drive members; and a drive mechanism for driving the first and second drive members along the second axis;

wherein when the first drive member is driven over a first predetermined range along the second axis, the support rods of the drive unit slide within the inclined portions of the third grooves defined in the opposing plates of the first drive member such that the drive unit is moved a first predetermined distance along the first axis; and wherein when the second drive member is driven over a second predetermined range along the second axis, the support rods of the drive unit slide within the inclined portions of the fourth grooves defined in the opposing plates of the second drive member such that the drive unit is moved a second predetermined distance along the first axis.

2. The apparatus of claim 1, wherein each of the third grooves and the fourth grooves include a release portion aligned parallel to the first axis, wherein when the drive unit is driven parallel to the first axis by the first drive member, each of the support rods of the drive unit is located in the inclined portion of one of the third grooves of the first drive member, and is located in the release portion of one of the fourth grooves of the second drive member, and wherein when the drive unit is driven parallel to the first axis by the second drive member, each of the support rods of the drive unit is located in the inclined portion of one of the fourth grooves of the second drive member, and is located in the release portion of one of the third grooves of the first drive member.

3. The apparatus according to claim 1, wherein the drive mechanism includes a rotary member defining a first cam groove and a second cam groove, wherein the first drive member includes a first protrusion slidably received in the first cam groove, wherein the second drive member includes a second protrusion slidably received in the second cam groove, wherein when the rotary member rotates within a first predetermined angular range, the first protrusion slides in the first cam groove such that the first drive member is driven over the first predetermined range along the second axis, and wherein when the rotary member rotates within a second predetermined angular range, the second protrusion of the second drive member slides in the second cam groove such that the second drive member is driven over the second predetermined range along the second axis.

4. The apparatus according to claim 3, wherein first drive member includes a first bottom plate connected between the opposing plates, the first protrusion being rigidly attached to the first bottom plate, and wherein the second drive member includes a second bottom plate connected between the opposing plates, the second protrusion being rigidly attached to the second bottom plate.

5. The apparatus according to claim 3, wherein the rotary member is a disk having first and second opposing surfaces, wherein the first groove is defined on the first surface of the rotary member, and wherein the second groove is defined on the second surface of the rotary member.

6. The apparatus according to claim 5, wherein the first and second grooves are defined symmetrically with respect to a center of the rotary member.

7. A recording medium selection and drive apparatus comprising:

a chassis having first and second opposing side plates, each of the first and second plates defining a first groove aligned parallel to a first axis and a second groove aligned parallel to a second axis, the first axis being perpendicular to the second axis;

a container mounted on the chassis, the container having a plurality of holding areas, each holding area formed to receive a recording medium, the plurality of holding areas being arranged such the received recording media are stacked in a first direction parallel to a first axis;

a drive unit for driving a selected recording medium removed from a predetermined holding area of the container, the drive unit having projections received in the first grooves defined by the first and second side plates of the chassis such that movement of the drive unit is restricted by the first grooves to movement parallel to the first axis, the drive unit being located adjacent the container such that predetermined movement of the drive unit in the first direction positions the drive unit adjacent the selected holding area of the container;

a drive member having projections received in the second grooves of the chassis such that movement of the drive member is restricted by the second grooves to movement parallel to the second axis, the drive member including a power converting mechanism which is coupled to the drive member, wherein motion of the drive member in the second direction is converted by the power converting mechanism such that the drive unit is moved in the first direction;

a cam member rotatably mounted to the chassis and connected to the drive member such that rotation of the cam member causes the drive member to move in the second direction; and a drive source connected to the cam member for rotating the cam member;

wherein the cam member comprises a rotary member having a groove defined in a surface thereof, the groove including first and second arch portions formed at predetermined radii with respect to a center of rotation of the rotary member, the groove also including a drive portion located between the first and second arch portions, wherein the drive member further comprises a protrusion received in the groove, wherein when the protrusion is located within the first arch portion, the drive unit is positioned relative to a first holding area for removing a recording medium stored therein, wherein when the protrusion is located within the second arch portion, the drive unit is positioned relative to a second holding area for removing a recording medium stored therein, and wherein when the protrusion is located within the drive portion and the rotary member is rotating, the drive member moves parallel to the second axis, thereby causing the drive unit to move parallel to the first axis between the first and second holding areas.

8. The apparatus according to claim 7, wherein the power converting mechanism includes an inclined guide portion formed on a first one of the drive unit and the drive member, the inclined guide portion being inclined at a predetermined angle with respect to the first and second axes, and wherein when the drive member is driven in the second direction, a guided portion provided on a second one of the drive member and the drive unit slides within the inclined guide portion.

9. The apparatus according to claim 8, wherein the inclined guide portion is an elongated hole formed in the power converting mechanism, and wherein the guided portion comprises a support rod inserted into the elongated hole.

* * * * *